(12) United States Patent
Pieper et al.

(10) Patent No.: US 12,093,018 B2
(45) Date of Patent: Sep. 17, 2024

(54) SYSTEMS AND METHODS FOR THREE-DIMENSIONAL PRINTING

(71) Applicant: Relativity Space, Inc., Long Beach, CA (US)

(72) Inventors: Forrest Pieper, Waltham, MA (US); Mario Barrenechea, Arlington, MA (US); William Gorman, Essex, MA (US)

(73) Assignee: Relativity Space, Inc., Long Beach, CA (US)

( * ) Notice: Subject to any disclaimer, the term of this patent is extended or adjusted under 35 U.S.C. 154(b) by 475 days.

(21) Appl. No.: 17/378,875

(22) Filed: Jul. 19, 2021

(65) Prior Publication Data
US 2022/0075346 A1    Mar. 10, 2022

Related U.S. Application Data

(63) Continuation of application No. PCT/US2020/015806, filed on Jan. 30, 2020.

(60) Provisional application No. 62/800,994, filed on Feb. 4, 2019, provisional application No. 62/800,339, filed on Feb. 1, 2019.

(51) Int. Cl.
*G05B 19/4099*    (2006.01)

(52) U.S. Cl.
CPC ............ *G05B 19/4099* (2013.01); *G05B 2219/49023* (2013.01)

(58) Field of Classification Search
CPC ...... G05B 19/4099; G05B 2219/49023; B33Y 50/00; B29C 64/386; G06F 30/12
See application file for complete search history.

(56) References Cited

U.S. PATENT DOCUMENTS

| 9,364,995 B2 * | 6/2016 | Roberts, IV | .......... B29C 64/106 |
| 9,636,871 B2 * | 5/2017 | Butler | .................. B29C 64/386 |

(Continued)

FOREIGN PATENT DOCUMENTS

| GB | 2491472 B | 6/2018 |
| WO | 2020/160214 A1 | 8/2020 |

OTHER PUBLICATIONS

International Preliminary Report on Patentability for International Application PCT/US2020/015806, Report issued Jul. 27, 2021, Mailed on Aug. 12, 2021, 5 Pgs.

(Continued)

*Primary Examiner* — M. N. Von Buhr

(57) ABSTRACT

The present disclosure provides methods and systems for three-dimensional (3D) printing. In an example, a system and method for maintaining a command history in 3D printing software is disclosed. In an example, a method for updating a plurality of printing instructions comprises maintaining a plurality of printing states corresponding to the plurality of printing instructions, wherein a first state corresponds to a first set of printing instructions for printing a first portion of a 3D object. The plurality of printing states may comprise a final state comprising final printing instructions. User instructions may be received to select a second state that is not the final state. A new state may be generated comprising a second set of printing instructions for printing second portion of the 3D object. The plurality of printing instructions may be updated with the second set of printing instructions to yield an updated plurality of printing instructions.

20 Claims, 14 Drawing Sheets

(56) References Cited

U.S. PATENT DOCUMENTS

| | | | | |
|---|---|---|---|---|
| 9,925,725 | B2* | 3/2018 | Batchelder | B33Y 50/02 |
| 10,029,406 | B2 | 7/2018 | Burke et al. | |
| 10,569,472 | B2* | 2/2020 | Zhang | G06F 3/1208 |
| 10,576,688 | B2* | 3/2020 | Matsuda | B29C 64/393 |
| 10,603,841 | B2* | 3/2020 | Mark | B33Y 10/00 |
| 10,754,311 | B2* | 8/2020 | Matsuda | B33Y 30/00 |
| 11,014,305 | B2* | 5/2021 | Mark | B29C 64/209 |
| 11,198,248 | B2* | 12/2021 | Sayers | B29C 64/182 |
| 11,325,313 | B2* | 5/2022 | Manousakis | B33Y 50/02 |
| 11,718,036 | B2* | 8/2023 | Taig | G06T 17/10 |
| | | | | 700/118 |
| 2014/0271964 | A1 | 9/2014 | Roberts, IV et al. | |
| 2015/0251356 | A1 | 9/2015 | Batchelder | |
| 2016/0171354 | A1 | 6/2016 | Glasgow et al. | |
| 2017/0023929 | A1 | 1/2017 | Matsuda | |
| 2017/0052516 | A1* | 2/2017 | Minardi | B29C 64/118 |
| 2018/0275636 | A1* | 9/2018 | Zhao | B22F 12/90 |
| 2021/0252642 | A1 | 8/2021 | Williams et al. | |
| 2023/0144822 | A1 | 5/2023 | Sales | |

OTHER PUBLICATIONS

International Search Report and Written Opinion for International Application No. PCT/US2020/015806, Search Completed May 26, 2020, Mailed May 26, 2020, 7 pgs.

* cited by examiner

SYSTEMS AND METHODS FOR THREE-DIMENSIONAL PRINTING

CROSS-REFERENCE

This application is a continuation of International Patent Application No. PCT/US20/15806, filed Jan. 30, 2020, which claims priority to U.S. Provisional Patent Application No. 62/800,339, filed on Feb. 1, 2019, and U.S. Provisional Patent Application No. 62/800,994, filed Feb. 4, 2019, each of which is entirely incorporated herein by reference.

BACKGROUND

Additive manufacturing techniques such as three-dimensional (3D) printing are rapidly being adopted as useful techniques for a host of different applications, including rapid prototyping and the fabrication of specialty components. Additive manufacturing processes may use polymeric materials, which are melted, layer-by-layer, into specified patterns to form 3D objects, or metallic objects, such as metal powder.

Existing technologies for the additive manufacture of metal structures may generally be classified in three categories: laser sintering, adhesive bonding followed by sintering, and molten metal deposition. The two sintering technologies use a bed of metal powder in the build area, and the powder particles are selectively joined to one another to form the pattern. When one layer is completed, more metal powder is spread over the first layer, and powder particles are joined to the layer in the pattern required for that layer. The process continues with fresh powder spread over the entire surface of the build area and then selectively joined, building the structure layer by layer. The finished part is retrieved from inside the powder bed, and the powder is then emptied from the build area to begin the next part.

Laser sintering uses a high power laser as the source of heat to fuse particles. Adhesive bonding uses glue to join adjacent powder particles instead of directly fusing the particles by laser energy, but the process is otherwise similar. Glue is selectively sprayed to form a pattern, and powder is added layer by layer to form the structure. In molten-metal deposition techniques, heat to liquefy the metal is derived from plasma or electric arc. The molten metal is then sprayed in the pattern to form a structure by building layers as the metal cools. The resolution achieved by spraying metal is generally poor compared to other processes, to the extent that hybrid machines have been developed to deposit metal, allow it to cool, and then use a milling tool to machine it to size.

Software may be used to generate a computer model of a part prior to printing. Such software may be computer aided design (CAD) software, which may permit a user to visualize a part for printing.

Additionally, the software or algorithm accompanied with an additive manufacturing process (e.g., a 3D printing process) may present limited information to a user when the additive manufacturing process is performed, and the limited information may include whether the 3D printing process is finished, the appearance of the 3D object to be printed, and the time required to print the 3D object.

SUMMARY

As recognized herein, in different modalities of three-dimensional (3D) printing, it may be beneficial to be able to visualize a manner in which a 3D object is printing. There may be many methods of printing an object, but only a few may be optimal or otherwise preferred. For example, there may be an optimal or otherwise preferred way to segment a 3D object into slices, or an optimal or otherwise preferred order to print parts, based on length of time, movement of the toolpath, cooling time for the material, or other factors. A user may wish to try multiple methods of printing, using multiple sets of printing instructions. But there is currently not a system that lets users do this easily.

In an aspect, the present disclosure provides a method for updating a plurality of printing instructions for a three-dimensional (3D) printer, comprising: (a) maintaining a plurality of printing states corresponding to the plurality of printing instructions usable by the 3D printer for printing a 3D object, wherein a first state of the plurality of printing states corresponds to a first set of one or more printing instructions of the plurality of printing instructions usable by the 3D printer to print a first portion of the 3D object, wherein the plurality of printing states comprises a final state comprising one or more final printing instructions of the plurality of printing instructions; (b) receiving user instructions to select a second state of the plurality of printing states, wherein the second state is not the final state; (c) generating a new state comprising a second set of one or more printing instructions usable by the 3D printer to print a second portion of the 3D object, wherein the second portion of the 3D object at least partially overlaps with the first portion of the 3D object; and (d) updating the plurality of printing instructions with the second set of one or more printing instructions in computer memory, to yield an updated plurality of printing instructions.

In some embodiments, in (b), the user instructions are received via a user interface. In some embodiments, in (a), the plurality of printing instructions is provided in a command history. In some embodiments, in (a), the command history is provided by a user. In some embodiments, the method for updating the plurality of printing instructions further comprises, subsequent to (d), directing the updated plurality of printing instructions or derivative thereof to the 3D printer to print the 3D object. In some embodiments, the plurality of printing instructions comprise an operation selected from the group consisting of creating a segment, ordering a segment, and splitting a segment. In some embodiments, the 3D object is viewable as a set of stacked segments. In some embodiments, the 3D object is viewable as a set of stacked toolpaths. In some embodiments, individual slices of a model of the 3D object are selected and processed using at least the plurality of printing instructions. In some embodiments, individual segments of slices of a model of the 3D object are selected and processed using at least the plurality of printing instructions. In some embodiments, portions of a toolpath of the 3D printer are selected and individually manipulated using at least the plurality of printing instructions.

In another aspect, the present disclosure provides a system for printing a three-dimensional (3D) object comprising a set of stacked layers, the system comprising: a visualization window configured to display (i) the 3D object divided into slices, wherein the slices are divided into segments, and wherein the segments include one or more toolpaths for a 3D printer to traverse, (ii) a command history that maintains one or more sequences of instructions for printing the 3D object, (iii) a command queue for entering commands, and (iv) a selection hierarchy comprising an organization of individual segments and slices, wherein multiple individual segments and slices from the organization of individual segments and slices is selected and provided instructions for printing; and a controller operatively coupled to the visualization window, wherein the controller is configured to direct the visualization window to display (1) a model of the 3D object, (2) the command history, (3) the command queue, and (4) the selection hierarchy.

In another aspect, the present disclosure provides a system for updating a plurality of printing instructions for a three-dimensional (3D) printer, comprising: computer memory configured to maintain a plurality of printing states corresponding to the plurality of printing instructions usable by the 3D printer for printing a 3D object, wherein a first state of the plurality of printing states corresponds to a first set of one or more printing instructions of the plurality of printing instructions usable by the 3D printer to print a first portion of the 3D object, wherein the plurality of printing states comprises a final state comprising one or more final printing instructions of the plurality of printing instructions; and one or more computer processors operatively coupled to the computer memory, wherein the one or more computer processors are individually or collectively configured to (i) receive user instructions to select a second state of the plurality of printing states, wherein the second state is not the final state; (ii) generate a new state comprising a second set of one or more printing instructions usable by the 3D printer to print a second portion of the 3D object, wherein the second portion of the 3D object at least partially overlaps with the first portion of the 3D object; and (iii) update the plurality of printing instructions with the second set of one or more printing instructions in computer memory, to yield an updated plurality of printing instructions.

In some embodiments, the one or more computer processors are individually or collectively configured to receive the user instructions via a user interface. In some embodiments, the one or more computer processors are individually or collectively configured to provide the plurality of printing instructions in a command history. In some embodiments, the one or more computer processors are individually or collectively configured to provide the command history inputted by a user. In some embodiments, the one or more computer processors are individually or collectively configured to direct the updated plurality of printing instructions or derivative thereof to the 3D printer to print the 3D object. In some embodiments, the one or more computer processors are individually or collectively configured to present the 3D object as a set of stacked segments. In some embodiments, the one or more computer processors are individually or collectively configured to present the 3D object as a set of stacked toolpaths. In some embodiments, the one or more computer processors are individually or collectively configured to select and process individual slices of a model of the 3D object using at least the updated plurality of printing instructions. In some embodiments, the one or more computer processors are individually or collectively configured to select and process individual segments of slices of a model of the 3D object using at least the updated plurality of printing instructions. In some embodiments, the one or more computer processors are individually or collectively configured to select and manipulate individual portions of a toolpath of the 3D printer using the updated plurality of printing instructions.

In another aspect, the present disclosure provides a non-transitory computer-readable medium comprising machine-executable code that, upon execution by one or more computer processors, implements a method for updating a plurality of printing instructions for a three-dimensional (3D) printer, the method comprising: (a) maintaining a plurality of printing states corresponding to the plurality of printing instructions usable by the 3D printer for printing a 3D object, wherein a first state of the plurality of printing states corresponds to a first set of one or more printing instructions of the plurality of printing instructions usable by the 3D printer to print a first portion of the 3D object, wherein the plurality of printing states comprises a final state comprising one or more final printing instructions of the plurality of printing instructions; (b) receiving user instructions to select a second state of the plurality of printing states, wherein the second state is not the final state; (c) generating a new state comprising a second set of one or more printing instructions usable by the 3D printer to print a second portion of the 3D object, wherein the second portion of the 3D object at least partially overlaps with the first portion of the 3D object; and (d) updating the plurality of printing instructions with the second set of one or more printing instructions in computer memory, to yield an updated plurality of printing instructions.

In another aspect, the present disclosure provides a computer-implemented method for displaying a plurality of cross-sections of a three-dimensional (3D) object, which plurality of cross-sections is usable by a 3D printer to print the 3D object, the method comprising: (a) using one or more computer processors to (i) receive a computer model of the 3D object and (ii) use at least the computer model of the 3D object to generate the plurality of cross-sections of the 3D object, wherein the plurality of cross-sections of the 3D object comprise a plurality of toolpaths usable by the 3D printer to print at least a portion of the 3D object, wherein the plurality of cross-sections of the 3D object comprise a cross-section and one or more additional cross-sections, and wherein the cross-section and the one or more additional cross-sections are vertically oriented with respect to one another; and (b) simultaneously presenting the plurality of cross-sections of the 3D object comprising the plurality of toolpaths in a navigational panel of a user interface on an electronic display operatively coupled to the one or more computer processors, wherein the plurality of cross-sections of the 3D object are presented in order of increasing vertical distance away from the cross-section.

In some embodiments, the computer-implemented method for displaying the plurality of cross-sections of the 3D object further comprises receiving a selection of a given cross-section of the plurality of cross-sections of the 3D object, and receiving a request to perform a 3D printer toolpath-related or 3D object-related command on the given cross-section. In some embodiments, the 3D printer toolpath-related or 3D object-related command comprises selecting at least one sub-section of the given cross-section. In some embodiments, the at least one sub-section comprises at least one toolpath that is removed upon receiving the request. In some embodiments, the 3D printer toolpath-related or 3D object-related command comprises selecting at least two sub-sections of the plurality of cross-sections and merging the at least two sub-sections. In some embodiments, the computer-implemented method for displaying the plurality of cross-sections further comprises presenting in the user interface the selection of the given cross-section of the plurality of cross-sections. In some embodiments, the 3D printer toolpath-related or 3D object-related command comprises presenting an alternative plurality of toolpaths of the plurality of cross-sections, wherein the alternative plurality of toolpaths are different from the plurality of toolpaths. In some embodiments, the generate the plurality of cross-sections of the 3D object in (a) further comprises ordering the plurality of cross-sections along a fundamental length scale of the 3D object.

In some embodiments, the computer-implemented method for displaying the plurality of cross-sections further comprises highlighting at least one of the plurality of cross-sections (1) based at least in part on user input in the navigational panel of the user interface or (2) at least in response to a 3D printer toolpath-related or 3D object-related command on a given cross-section of the plurality of cross-sections. In some embodiments, the computer-implemented method for displaying the plurality of cross-sections further comprises highlighting at least one sub-section of a given cross-section of the plurality of cross-sections (1) based at least in part on user input in the navigational panel of the user interface or (2) at least in response to a 3D printer toolpath-related or 3D object-related command on the given cross-section of the plurality of cross-sections. In some embodiments, the computer-implemented method for displaying the plurality of cross-sections further comprises using the plurality of cross-sections to generate 3D printing instructions for printing the 3D object. In some embodiments, the computer-implemented method for displaying the plurality of cross-sections further comprises using the 3D printing instructions to print the 3D object.

In another aspect, the present disclosure provides a computer-implemented method for displaying a plurality of cross-sections of a three-dimensional (3D) object, which plurality of cross-sections is usable by a 3D printer to print the 3D object, the method comprising: (a) using one or more computer processors to (i) receive a computer model of the 3D object and (ii) use at least the computer model to generate the plurality of cross-sections of the 3D object, wherein the plurality of cross-sections comprise a plurality of toolpaths usable by the 3D printer to print at least a portion of the 3D object, wherein the plurality of cross-sections comprises a cross-section and one or more additional cross-sections, and wherein the cross-section and the one or more additional cross-sections are vertically oriented with respect to one another; (b) presenting the plurality of cross-sections comprising the plurality of toolpaths in a navigational panel of a user interface on an electronic display operatively coupled to the one or more computer processors; (c) receiving, from the user interface, a request to adjust at least one toolpath of the cross-section of the plurality of cross-sections to yield an adjusted at least one toolpath; and (d) upon receiving the request, adjusting one or more toolpaths of at least a subset of the one or more additional cross-sections in accordance with the adjusted at least one toolpath in (c) to yield an adjusted one or more toolpaths.

In some embodiments, the computer-implemented method for displaying a plurality of cross-sections further comprises presenting in the user interface the adjusted one or more toolpaths. In some embodiments, the adjusting in (d) comprises removing the one or more toolpaths of the at least the subset of the one or more additional cross-sections. In some embodiments, the generate the plurality of cross-sections of the 3D object in (a) further comprises ordering the plurality of cross-sections along a fundamental length scale of the 3D object. In some embodiments, the computer-implemented method for displaying a plurality of cross-sections further comprises highlighting at least one of the plurality of cross-sections (i) based at least in part on user input in the navigational panel of the user interface or (ii) at least in response to a 3D printer toolpath-related or 3D object-related command on a given cross-section of the plurality of cross-sections. In some embodiments, the computer-implemented method for displaying a plurality of cross-sections further comprises highlighting at least one sub-section of a given cross-section of the plurality of cross-sections (i) based at least in part on user input in the navigational panel of the user interface or (ii) at least in response to a 3D printer toolpath-related or 3D object-related command on a given cross-section of the plurality of cross-sections. In some embodiments, the computer-implemented method for displaying a plurality of cross-sections further comprises using the plurality of cross-sections to generate 3D printing instructions for printing the 3D object. In some embodiments, the computer-implemented method for displaying a plurality of cross-sections further comprises using the 3D printing instructions by the 3D printer to print the 3D object.

In another aspect, the present disclosure provides a system for displaying a plurality of cross-sections of a three-dimensional (3D) object, which plurality of cross-sections is usable by a 3D printer to print the 3D object, the system comprising: computer memory storing a computer model of the 3D object; and one or more computer processors operatively coupled to the computer memory, wherein the one or more computer processors are individually or collectively programmed to (i) receive the computer model of the 3D object from the computer memory, (ii) use at least the computer model to generate the plurality of cross-sections of the 3D object, wherein the plurality of cross-sections comprise a plurality of toolpaths usable by the 3D printer to print at least a portion of the 3D object, wherein the plurality of cross-sections comprise a cross-section and one or more additional cross-sections, and wherein the cross-section and the one or more additional cross-sections are vertically oriented with respect to one another, and (iii) provide the plurality of cross-sections comprising the plurality of toolpaths for display in a navigational panel of a user interface on an electronic display operatively coupled to the one or more computer processors, wherein the plurality of cross-sections are presented in order of increasing vertical distance away from the cross-section.

In another aspect, the present disclosure provides a system for displaying a plurality of cross-sections of a three-dimensional (3D) object, which plurality of cross-sections is usable by a 3D printer to print the 3D object, the system comprising: computer memory storing a computer model of the 3D object; and one or more computer processors operatively coupled to the computer memory, wherein the one or more computer processors are individually or collectively programmed to (i) receive the computer model of the 3D object from the computer memory; (ii) use at least the computer model to generate the plurality of cross-sections of the 3D object, wherein the plurality of cross-sections comprise a plurality of toolpaths usable by the 3D printer to print at least a portion of the 3D object, wherein the plurality of cross-sections comprises a cross-section and one or more additional cross-sections, and wherein the cross-section and the one or more additional cross-sections are vertically oriented with respect to one another; (iii) provide the plurality of cross-sections comprising the plurality of toolpaths for display in a navigational panel of a user interface on an electronic display operatively coupled to the one or more computer processors; (iv) receive, from the user interface, a request to adjust at least one toolpath of the cross-section of the plurality of cross-sections to yield an adjusted at least one toolpath; and (v) upon receiving the request, adjust one or more toolpaths of at least a subset of the one or more additional cross-sections in accordance with the adjusted at least one toolpath.

In another aspect, a method for updating a plurality of printing instructions for a three-dimensional (3D) printer is disclosed. The method comprises (a) maintaining a plurality of printing states corresponding to the plurality of printing instructions usable by the 3D printer for printing a 3D object. A first state of the plurality of printing states corresponds to a first set of one or more printing instructions of the plurality of printing instructions usable by the 3D printer to print a first portion of the 3D object. The plurality of printing states comprises a final state comprising one or more final printing instructions of the plurality of printing instructions. The method further comprises (b) receiving instructions to select a second state of the plurality of states. The second state is not the final state. The method further comprises (c) generating a new state comprising a second set of one or more printing instructions usable by the 3D printer to print a second portion of the 3D object. The second portion of the 3D object at least partially overlaps with the first portion. Finally, the method comprises updating the plurality of printing instructions with the second set of one or more printing instructions in computer memory, to yield an updated plurality of printing instructions.

In some embodiments, in (b), instructions are received by way of a request from a user.

In some embodiments, in (a), the plurality of printing instructions is provided in a command history.

In some embodiments, in (a), the command history is provided by a user.

In some embodiments, the method further comprises, subsequent to (d), directing the updated plurality of printing instructions or derivative thereof to the 3D printer to print the 3D object.

In some embodiments, the plurality of printing instructions comprises an operation selected from the group consisting of creating a segment, ordering a segment, and splitting a segment.

In some embodiments, the 3D object is viewable as a set of stacked segments.

In some embodiments, the 3D object is viewable as a set of stacked toolpaths.

In some embodiments, individual slices of a model of the 3D object are selected and processed using at least the plurality of printing instructions.

In some embodiments, individual segments of slices of a model of the 3D object are selected and processed using at least the plurality of printing instructions.

In some embodiments, portions of a toolpath of the 3D printer are selected and individually manipulated using at least the plurality of printing instructions.

In another aspect, a system for printing a three-dimensional (3D) object comprising a set of stacked layers is disclosed. The system comprises a visualization window configured to display (i) the 3D object divided into slices. The slices are divided into segments, and the segments include one or more toolpaths for a 3D printer to traverse. The system further comprises (ii) a command history that maintains one or more sequences of instructions for printing the 3D object. The system further comprises (iii) a command queue for entering commands. Further, the system comprises (iv) a selection hierarchy comprising an organization of individual segments and slices. Multiple individual segments and slices from the organization may be selected and provided instructions for printing. The system also comprises a controller operatively coupled to the visualization window. The controller is configured to direct the visualization window to display (1) a model of the 3D object, (2) the command history, (3) the command queue, and (4) the selection hierarchy.

In another aspect, a system for updating a plurality of printing instructions for a three-dimensional (3D) printer is disclosed. The system comprises computer memory configured to maintain a plurality of printing states corresponding to the plurality of printing instructions usable by the 3D printer for printing a 3D object. A first state of the plurality of printing states corresponds to a first set of one or more printing instructions of the plurality of printing instructions usable by the 3D printer to print a first portion of the 3D object. The plurality of printing states comprises a final state comprising one or more final printing instructions of the plurality of printing instructions. The system further comprises one or more computer processors operatively coupled to the computer memory. The one or more computer processors are individually or collectively configured to (i) receive instructions to select a second state of the plurality of states. The second state is not the final state. The computer processors are further configured to (ii) generate a new state comprising a second set of one or more printing instructions usable by the 3D printer to print a second portion of the 3D object. The second portion of the 3D object at least partially overlaps with the first portion. The computer processors are further configured to (iii) update the plurality of printing instructions with the second set of one or more printing instructions in computer memory, to yield an updated plurality of printing instructions.

In some embodiments, the one or more computer processors are individually or collectively configured to receive the instructions by way of a request from a user.

In some embodiments, the one or more computer processors are individually or collectively configured to provide the plurality of printing instructions in a command history.

In some embodiments, the one or more computer processors are individually or collectively configured to provide the command history inputted by a user.

In some embodiments, the one or more computer processors are individually or collectively configured to direct the updated plurality of printing instructions or derivative thereof to the 3D printer to print the 3D object.

In some embodiments, the one or more computer processors are individually or collectively configured to present the 3D object as a set of stacked segments.

In some embodiments, the one or more computer processors are individually or collectively configured to present the 3D object as a set of stacked toolpaths.

In some embodiments, the one or more computer processors are individually or collectively configured to select and process individual slices of the model of the 3D object using at least the plurality of printing instructions.

In some embodiments, the one or more computer processors are individually or collectively configured to select and process individual segments of slices of the model of the 3D object using at least the printing instructions.

In some embodiments, the one or more computer processors are individually or collectively configured to select and manipulate individual portions of a toolpath of the 3D printer using the printing instructions.

In another aspect, a non-transitory computer-readable medium comprising machine-executable code that, upon execution by one or more computer processors, implements a method for updating a plurality of printing instructions for a three-dimensional (3D) printer is disclosed. The method comprises (a) maintaining a plurality of printing states corresponding to the plurality of printing instructions usable by the 3D printer for printing a 3D object. A first state of the plurality of printing states corresponds to a first set of one or more printing instructions of the plurality of printing instructions usable by the 3D printer to print a first portion of the 3D object. The plurality of printing states comprises a final state comprising one or more final printing instructions of the plurality of printing instructions. The method further comprises (b) receiving instructions to select a second state of the plurality of states. The second state is not the final state. The method further comprises (c) generating a new state comprising a second set of one or more printing instructions usable by the 3D printer to print a second portion of the 3D object. The second portion of the 3D object at least partially overlaps with the first portion. Finally, the method comprises updating the plurality of printing instructions with the second set of one or more printing instructions in computer memory, to yield an updated plurality of printing instructions.

In another aspect, the present disclosure provides systems and methods that may help avoid various limitations shown by the software or algorithm accompanied with a three-dimensional (3D) printing process. For instance, to print a 3D object efficiently, the method disclose herein may allow a user to check cross-sections of the 3D object to select a quicker route of printing. Such a method may be a computer-implemented method for displaying a plurality of cross-sections of a 3D object. The compute-implemented method may demonstrate a tiled view window. The tiled view window may be a view window that displays two-dimensional cross-sections of a 3D object adjacent to one another on a center panel. The tiled view window may be designed to preview selected cross-sections of the 3D object before applying commands to the selected cross-sections. The tiled view window may be useful when performing operations across different cross-sections, and such operations may comprise switching to an alternating toolpath on a given cross-section. The tiled view window may comprise grid-style tile cards, each showing one cross-section (or slice) or segment within the cross-section. The tile cards may be organized from top to bottom. A vertical scroll bar presented next to the tiled view window may allow the user to survey all the selected cross-sections or toolpaths even if they do not fit on the screen. A vertical layer slider may be next to the vertical scroll bar, and the vertical layer slider may allow the user to filter cross-sections that fall within a specific range as a function of height of a 3D object.

Without losing the current selection, the user can click on toolpaths within any tile card or cross-section to highlight the entire cross-section or specific sub-sections within the cross-section. After the user highlights the cross-section or specific subsections, the user can perform different commands, such as removing toolpaths on the cross-section from the current selection or merging selected sub-sections.

In an aspect, a computer-implemented method for displaying a plurality of cross-sections of a three-dimensional (3D) object is disclosed. The plurality of cross-sections is usable by a 3D printer to print the 3D object. The method comprises (a) using one or more computer processors to (i) receive a computer model of the 3D object and (ii) use at least the computer model to generate the plurality of cross-sections of the 3D object. The plurality of cross-sections comprises a plurality of toolpaths usable by the 3D printer to print at least a portion of the 3D object. The plurality of cross-sections comprises a cross-section and one or more additional cross-sections. The cross-section and the one or more additional cross-sections are vertically oriented with respect to one another. The method further comprises (b) simultaneously presenting the plurality of cross-sections comprising the plurality of toolpaths in a navigational panel of a user interface on an electronic display operatively coupled to the one or more computer processors. The plurality of cross-sections is presented in order of increasing vertical distance away from the cross-section.

In some embodiments, the method further comprises receiving a selection of a given cross-section of the plurality of cross-sections, and receiving a request to perform a 3D printer toolpath-related or 3D object-related command on the given cross-section.

In some embodiments, the 3D printer toolpath-related or 3D object-related command comprises selecting at least one sub-section of the given cross-section.

In some embodiments, the at least one sub-section comprises at least one toolpath that is removed upon receiving the request.

In some embodiments, the method further comprises selecting at least two sub-sections of the plurality of cross-sections and merging the at least two sub-sections.

In some embodiments, the method further comprises presenting in the user interface the selection of the given cross-section of the plurality of cross-sections.

In some embodiments, the 3D printer toolpath-related or 3D object-related command comprises presenting alternative plurality of toolpaths of the plurality of cross-sections. The alternative plurality of toolpaths is different from the plurality of toolpaths.

In some embodiments, the generating in (a) further comprises ordering the plurality of cross-sections along a fundamental length scale of the 3D object.

In some embodiments, the method further comprises highlighting at least one of the plurality of cross-sections (i) based at least in part on user input in the navigational panel of the user interface or (ii) at least in response to a 3D printer toolpath-related or 3D object-related command on a given cross-section of the plurality of cross-sections.

In some embodiments, the method further comprises highlighting at least one sub-section of a given cross-section of the plurality of cross-sections (i) based at least in part on user input in the navigational panel of the user interface or (ii) at least in response to a 3D printer toolpath-related or 3D object-related command on the given cross-section of the plurality of cross-sections.

In some embodiments, the method further comprises using the plurality of cross-sections to generate 3D printer instructions for printing the 3D object.

In some embodiments, the method further comprises using the 3D printer instructions by the 3D printer to print the 3D object.

In another aspect, a computer-implemented method for displaying a plurality of cross-sections of a three-dimensional (3D) object is disclosed. The plurality of cross-sections is usable by a 3D printer to print the 3D object. The method comprises using one or more computer processors to (i) receive a computer model of the 3D object and (ii) use at least the computer model to generate the plurality of cross-sections of the 3D object. The plurality of cross-sections comprises a plurality of toolpaths usable by the 3D printer to print at least a portion of the 3D object. The plurality of cross-sections comprises a cross-section and one or more additional cross-sections, and wherein the cross-section and the one or more additional cross-sections are vertically oriented with respect to one another. The method further comprises presenting the plurality of cross-sections comprising the plurality of toolpaths in a navigational panel of a user interface on an electronic display operatively coupled to the one or more computer processors. The method further comprises receiving, from the user interface, a request to adjust at least one toolpath of the cross-section of the plurality of cross-sections; Finally, the method comprises, upon receiving the request, adjusting one or more toolpaths of at least a subset of the one or more additional cross-sections in accordance with the at least one toolpath adjusted in (c).

In some embodiments, the method further comprises presenting in the user interface the one or more toolpaths adjusted in (d).

In some embodiments, the adjusting in (d) comprises removing the one or more toolpaths of the at least the subset of the one or more additional cross-sections.

In some embodiments, the generating in (a) further comprises ordering the plurality of cross-sections along a fundamental length scale of the 3D object.

In some embodiments, the method further comprises highlighting at least one of the plurality of cross-sections (i) based at least in part on user input in the navigational panel of the user interface or (ii) at least in response to a 3D printer toolpath-related or 3D object-related command on a given cross-section of the plurality of cross-sections.

In some embodiments, the method further comprises highlighting at least one sub-section of a given cross-section of the plurality of cross-sections (i) based at least in part on user input in the navigational panel of the user interface or (ii) at least in response to a 3D printer toolpath-related or 3D object-related command on a given cross-section of the plurality of cross-sections.

In some embodiments, the method further comprises using the plurality of cross-sections to generate 3D printer instructions for printing the 3D object.

In some embodiments, the method further comprises using the 3D printer instructions by the 3D printer to print the 3D object.

In another aspect, a system for displaying a plurality of cross-sections of a three-dimensional (3D) object, which plurality of cross-sections is usable by a 3D printer to print the 3D object. The system comprises computer memory storing a computer model of the 3D object; and one or more computer processors operatively coupled to the computer memory. The one or more computer processors are individually or collectively programmed to (i) receive the computer model of the 3D object from the computer memory, and further comprised to (ii) use at least the computer model to generate the plurality of cross-sections of the 3D object. The plurality of cross-sections comprises a plurality of toolpaths usable by the 3D printer to print at least a portion of the 3D object. The plurality of cross-sections comprises a cross-section and one or more additional cross-sections. The cross-section and the one or more additional cross-sections are vertically oriented with respect to one another. The processors are further programmed to (iii) provide the plurality of cross-sections comprising the plurality of toolpaths for display in a navigational panel of a user interface on an electronic display operatively coupled to the one or more computer processors. The plurality of cross-sections is presented in order of increasing vertical distance away from the cross-section.

In another aspect, a system for displaying a plurality of cross-sections of a three-dimensional (3D) object, which plurality of cross-sections is usable by a 3D printer to print the 3D object. The system comprises computer memory storing a computer model of the 3D object; and one or more computer processors operatively coupled to the computer memory. The one or more computer processors are individually or collectively programmed to (i) receive the computer model of the 3D object from the computer memory and (ii) use at least the computer model to generate the plurality of cross-sections of the 3D object. The plurality of cross-sections comprises a plurality of toolpaths usable by the 3D printer to print at least a portion of the 3D object. The plurality of cross-sections comprises a cross-section and one or more additional cross-sections. The cross-section and the one or more additional cross-sections are vertically oriented with respect to one another. The one or more computer processors are further individually or collectively programmed to (iii) provide the plurality of cross-sections comprising the plurality of toolpaths for display in a navigational panel of a user interface on an electronic display operatively coupled to the one or more computer processors The one or more computer processors are further individually or collectively programmed to (iv) receive, from the user interface, a request to adjust at least one toolpath of the cross-section of the plurality of cross-sections. Finally, the one or more computer processors are further individually or collectively programmed to, (v) upon receiving the request, adjust one or more toolpaths of at least a subset of the one or more additional cross-sections in accordance with the at least one toolpath adjusted in (iv).

Another aspect of the present disclosure provides a non-transitory computer readable medium comprising machine executable code that, upon execution by one or more computer processors, implements any of the methods above or elsewhere herein.

Another aspect of the present disclosure provides a system comprising one or more computer processors and computer memory coupled thereto. The computer memory comprises machine executable code that, upon execution by the one or more computer processors, implements any of the methods above or elsewhere herein.

Additional aspects and advantages of the present disclosure will become readily apparent to those skilled in this art from the following detailed description, wherein only illustrative embodiments of the present disclosure are shown and described. As will be realized, the present disclosure is capable of other and different embodiments, and its several details are capable of modifications in various obvious respects, all without departing from the disclosure. Accordingly, the drawings and description are to be regarded as illustrative in nature, and not as restrictive.

INCORPORATION BY REFERENCE

All publications, patents, and patent applications mentioned in this specification are herein incorporated by reference to the same extent as if each individual publication, patent, or patent application was specifically and individually indicated to be incorporated by reference. To the extent publications and patents or patent applications incorporated by reference contradict the disclosure contained in the specification, the specification is intended to supersede and/or take precedence over any such contradictory material.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings (also "Figure" and "FIG." herein), of which:

DETAILED DESCRIPTION

Figure 1:
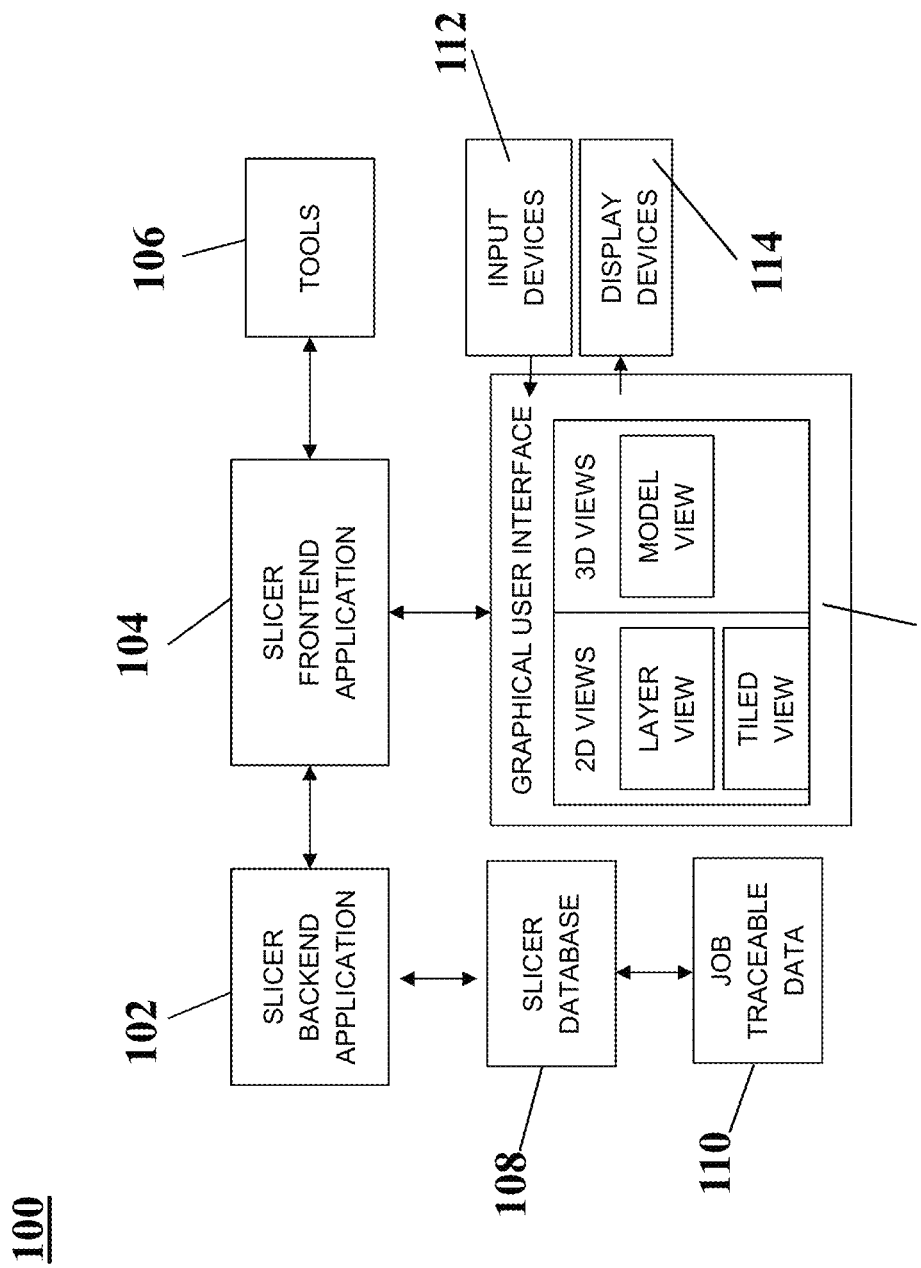
FIG. 1 shows an example of a block diagram of the system disclosed herein.

While various embodiments of the invention have been shown and described herein, it will be obvious to those skilled in the art that such embodiments are provided by way of example only. Numerous variations, changes, and substitutions may occur to those skilled in the art without departing from the invention. It should be understood that various alternatives to the embodiments of the invention described herein may be employed.

As used herein, the singular forms "a," "an," and "the" include plural references unless the context clearly dictates otherwise. Any reference to "or" herein is intended to encompass "and/or" unless otherwise stated.

The term "three-dimensional object" (also "3D object"), as used herein, generally refers to an object or a part that is printed by 3D printing. The 3D object may be at least a portion of a larger 3D object or an entirety of the 3D object.

Whenever the term "at least," "greater than," or "greater than or equal to" precedes the first numerical value in a series of two or more numerical values, the term "at least," "greater than" or "greater than or equal to" applies to each of the numerical values in that series of numerical values. For example, greater than or equal to 1, 2, or 3 is equivalent to greater than or equal to 1, greater than or equal to 2, or greater than or equal to 3.

Whenever the term "no more than," "less than," or "less than or equal to" precedes the first numerical value in a series of two or more numerical values, the term "no more than," "less than," or "less than or equal to" applies to each of the numerical values in that series of numerical values. For example, less than or equal to 3, 2, or 1 is equivalent to less than or equal to 3, less than or equal to 2, or less than or equal to 1.

The term "welding," as used herein, generally refers to a method of heating at least a portion of a feedstock (e.g., a metal wire) to form a pool of molten liquid (e.g., molten metal) on an object (e.g., a metal object). The pool of molten liquid may cool and solidify on the object. In some cases, the method may comprise heating the at least a portion of the feedstock and at least a portion of the object to form the pool of molten liquid.

The term "support," as used herein, generally refers to a structure that supports a nascent 3D object during printing and supports the 3D object after printing. The support may be a platform or an object that may not be a platform, such as another 3D object. The other object may be an object to be repaired or an object that is to be fused to another object (e.g., by a welding-type approach).

The term "feedstock," as used herein, generally refers to a material that is usable alone or in combination with other material to print a 3D object. In some examples, the feedstock may be (i) a wire, ribbon or sheet, (ii) a plurality of wires, ribbons or sheets, or (iii) a combination of two or more of wires, ribbons and sheets (e.g., combination of wires and ribbons). The feedstock may comprise at least one of polymers (e.g., thermoplastics), metals, metal alloys, ceramics, or mixtures thereof. The 3D printing may be performed with at least about 1, 2, 3, 4, 5, 6, 7, 8, 9, 10, or more feedstock(s). The 3D printing may be performed with at most about 20, 15, 10, 9, 8, 7, 6, 5, 4, 3, 2, or 1 feedstock(s).

Method for Generating Multiple Sets of Printing Instructions

The present disclosure provides a method for updating a plurality of printing instructions for a three-dimensional (3D) printer. Printing instructions may include instructions specifying a method of partitioning a 3D object, for example, into smaller 3D pieces. Objects or pieces may be further divided into two-dimensional (2D) slices (or layers) and 2D slices may be divided into segments. A particular arrangement of instructions may yield a particular order of printed segments.

A printing instruction may be associated with a printing state. For example, a splitting of a 3D object into specific 3D pieces may constitute a state. A creation of a specific partition of a slice into segments may constitute another state. States may be linked deterministically. For example, splitting a slice into a set of segments of given shapes may yield different automatic ordering configurations than splitting a slice into another set of differently-shaped segments. The method may include maintaining a plurality of printing states corresponding to the plurality of printing instructions usable by the 3D printer for printing a 3D object in a command history.

The printing states may be ordered and deterministically linked. The ordered printing states may include a first state and a final state. An individual printing state may be selected when a user selects an instruction corresponding to the individual state. The provided system and method may allow a user to backtrack a state or the corresponding instruction (operation) and create a new state or a set of instructions from any previous state or instruction (operation).

Selecting a state may provide a user with information about the state, such as an ID, a timestamp, a type, and one or more arguments. A user may execute commands on a "traceable set" of components of an object. A "traceable set" may be a grouping of 3D or 2D partitions of an object, such as a piece, a slice, or a segment. A "trace after" switch may be used to determine whether or not at least some of a traceable set may be re-traced for printing upon execution of the command. Using the "trace after" switch may prevent unnecessary backtracking by ensuring a command to be executed would yield a valid printable 3D object.

Printing instructions may be grouped in sets. When instructions are first entered by a user, they may be grouped in a first set. Subsequent sets may be added by the user, using the command history. These subsequent sets branch from instructions in the first set.

If a user wishes to undo any of the instructions in the set of instructions, and backtrack to a previous state, the user may use an undo or seek command. Using the seek command and entering additional subsequent instructions may generate a second set of one or more printing instructions usable by the 3D printer to print a second portion of the 3D object. The second portion of the 3D object may at least partially overlap with the first portion, initializing an additional branch. Finally, the method may update the plurality of printing instructions with the second set of one or more printing instructions in computer memory, to yield an updated plurality of printing instructions.

Instructions may be entered manually from a user of the 3D printer, or may be provided by a script. One or more instructions may be provided at a time. The instructions may be provided to a 3D printer to print a 3D object. A 3D object may be viewed as a set of stacked segments. A 3D object may be viewed as a set of stacked toolpaths. Portions of a toolpath may be selected and individually manipulated using commands. For example, individual commands may modify a shape of the toolpath or a direction of traversal of the printer along the toolpath. A user may be able to select instructions prior to a first instruction of a newly created branch in order to backtrack and revisit a previous printing state. In addition, a user may select one or more instructions on additional branches, in order to retrieve state information for these instructions. This may allow the user to switch from branch to branch in order to toggle between many sets of printing instructions.

Also disclosed is a system for directing a print job of a 3D object. The system includes a visualization window configured to display the 3D object divided into slices. The slices may be divided into segments, which may include one or more toolpaths for a 3D printer to traverse. The 3D object may be divided into one or more 3D pieces or 2D pieces, which may be further subdivided into slices and segments. The system also maintains a command history that maintains one or more sequences of instructions for printing the 3D object. A user may enter instructions directly into a command queue, or indirectly enter the instructions from elsewhere in the visualization window, such as from a toolbar or a popup window. The visualization window may also include a selection hierarchy comprising an organization of individual segments and slices. The selection hierarchy may enable multiple individual segments and slices from the organization to be selected and provided with printing instructions. The selection hierarchy may be organized as a tree or a list.

The system also may include a controller operatively coupled to the visualization window, wherein the controller may be configured to direct the visualization window to display the 3D object, command queue, command history, and selection hierarchy.

FIG. 1 shows an example of a block diagram of the system disclosed herein. The system 100 may comprise a slicer (cross-section) backend application 102, a slicer frontend application 104, tools 106, a slicer database 108, job traceable data 110, input devices 112, display devices 114, and a graphical user interface 116. The slicer backend application 102 may retrieve data from the slicer database 108 and provide data to the slicer frontend application 104. The slicer frontend application 104 may provide information to a user through the graphical user interface 116. The job traceable data 110 may be stored in the slicer database 108. The slicer database 108 may be a cloud-based database. The cloud-based database and associated software may be used for archiving electronic data, sharing electronic data, or analyzing electronic data. Data or datasets uploaded to a cloud-based database may be used to train machine learning algorithms.

The input devices 112 may comprise any electronic devices. The number of input devices may be at least about 1, 2, 3, 4, 5, 6, 7, 8, 9, 10, or greater. The number of input devices may be at most about 20, 15, 10, 9, 8, 7, 6, 5, 4, 3, 2, or 1. The electronic device(s) may be mobile phones, PCs, tablets, printers, consumer electronics, and appliances. The electronic device(s) may be a portable electronic device(s). The display devices 114 may comprise an electronic display(s). The graphical user interface 116 may demonstrate 2-dimensional views and 3-dimensional views. The 2-dimensional views may comprise layer views and tiled views. The 3-dimensional views may comprise model views. The views may comprise views of a 3D computer model.

The system 100 may comprise one or more internal databases. The system 100 may also use data from one or more external databases. The database may be a centralized database. The database may be connected with one or more processors. The one or more processors may analyze the data stored in the database through one or more algorithms. The one or more algorithms may comprise machine learning algorithms.

The system 100 may comprise one or more servers. The server may be in communication with the database. The server may comprise known computing components, such as one or more processors, one or more memory devices storing software instructions executed by the processor(s), and data. A server may have one or more processors and at least one memory for storing program instructions. The one or more processors can be a single or multiple microprocessors, field programmable gate arrays (FPGAs), or digital signal processors (DSPs) capable of executing particular sets of instructions. Computer-readable instructions may be stored on a tangible non-transitory computer-readable medium, such as a flexible disk, a hard disk, a CD-ROM (compact disk-read only memory), an MO (magneto-optical), a DVD-ROM (digital versatile disk-read only memory), a DVD-RAM (digital versatile disk-random access memory), or a semiconductor memory.

Figure 2A:
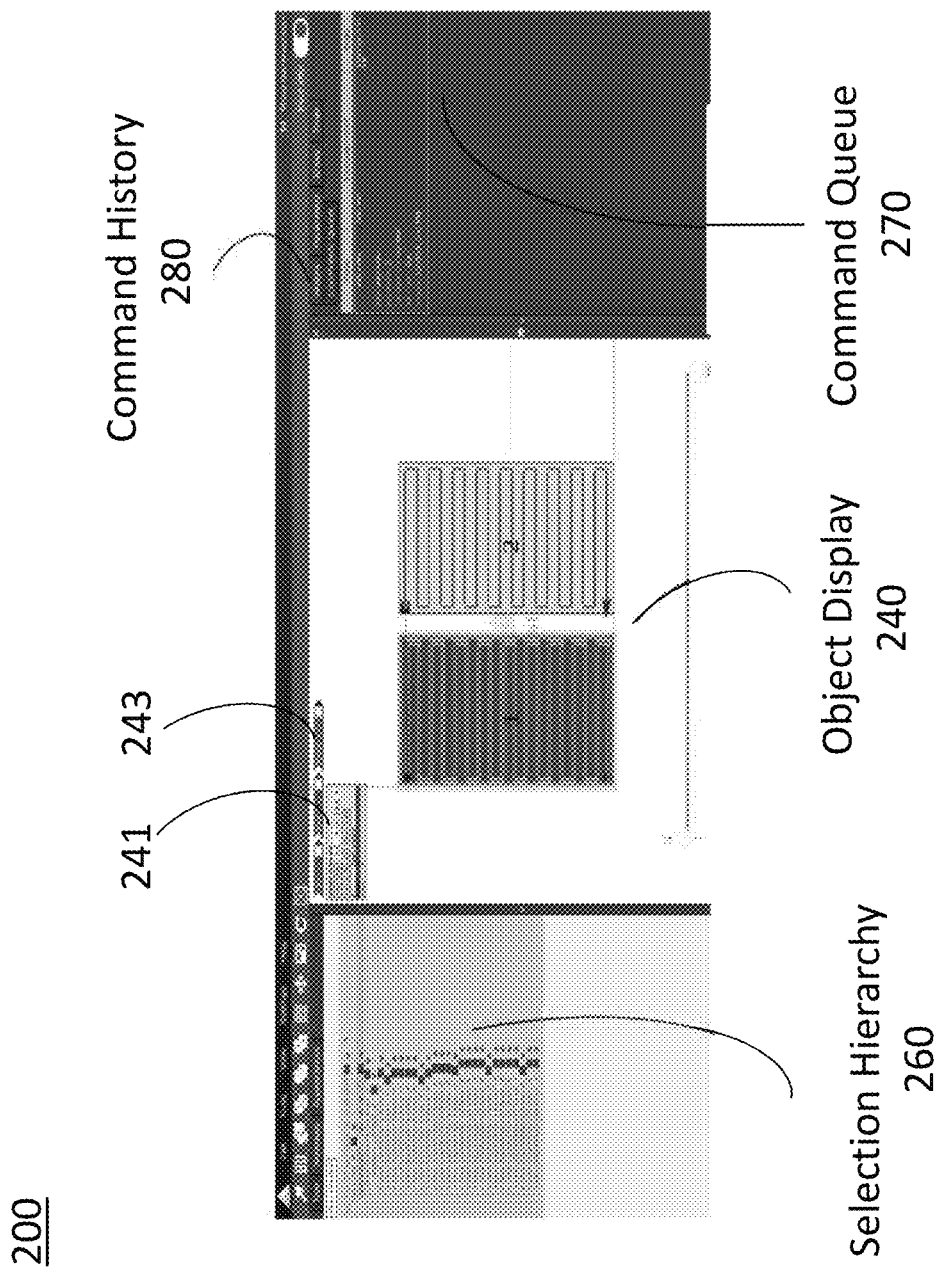
FIG. 2A shows a block diagram of a visualization window.

FIG. 2A shows a block diagram of a visualization window 200. The visualization window 200 includes an object display 240, a selection hierarchy 260, a command queue 270, and a command history 280. The visualization window of FIG. 2 may be displayed on a computer screen, such as that of a desktop computer, laptop computer, tablet, or mobile computing device. The individual elements of the visualization window may be modified in order to be interoperable with different 3D printing modalities. For example, the visualization window may be used to represent 3D objects printed by a metal wire printer or by a powder-based 3D printer. The visualization window may be part of a computer program that runs on different operating systems, such as WINDOWS®, APPLE® MACINTOSH, and LINUX-based operating systems. Individual functions of the elements within the visualization window may be performed by any of the elements described, and not only matched to the elements in the examples given within this disclosure.

The object display 240 may present a 2D or 3D view of the 3D object to be printed. For example, the object display 240 may present a 2D view of a selected segment or slice. The object display 240 may display a tiled view, showing multiple segments or slices displayed together on screen, in a grid, with space separating any given set of two tiled segments or slices. The object may also be displayed in a 3D view, which may be rotated in order to show different faces or orientations of the 3D object. The 3D view may be a stacked view, in which the 3D image is decomposed into stacked segments or slices, or in a tube view, in which the object display 240 presents individual toolpaths of the segments or slices in a stack. In both of the 2D and 3D views, a viewable object, piece, segment, or slice may be displayed on a grid and may be rotatable by a user. The object display 240 may display measurements, such as height, width, and, for 3D objects, depth. The object display 240 may use a set of coordinate axes, such as a Cartesian coordinate system. The object display 240 may, when displaying 3D views, display a number of faces, vertices, and edges of a 3D polyhedron object. The object display 240 may display a surface area or a volume of a 3D object. The object display 240 may present, for the displayed object, slice, or segment, a partial hierarchy. For example, for a segment, the object display 240 may present a segment number, a slice number to which the segment belongs, a piece number to which the slice belongs, and part (object) number to which the piece belongs, and a job identifier. In the illustrated example, information about various components of the 3D object or job (e.g., job number, part number, piece number, etc.) may be displayed in a hierarchical manner such as in the form of a breadcrumb. In some embodiments, the breadcrumb is an interactive breadcrumb provided on the graphical user interface such that a user may interact with the breadcrumb directly such as revert to the previous printing state. The segment number may correspond to an ordering of segments, which may be determined automatically (auto-ordering) or manually. One method of auto-ordering segments may use a greedy algorithm. The object display 240 may present one or more menus or submenus 241 allowing a user to modify parameters for entered commands. For example, an auto-order submenu may allow a user to set ordering parameters, such as minimum and maximum bounds for a height of the 3D object, measured in the z-direction. The object display 240 may also include a toolbar to implement one or more commands.

The selection hierarchy 260 may include the components of the 3D object to be printed. Components may include slices and segments. The 3D object may also be divided into 3D pieces, which may be divided into slices and segments. The pieces, slices, and segments may be labeled, for example, using a number. The slices may be ordered, for example, by height in millimeters from an origin plane. The selection hierarchy 260 may allow a user to select one or more particular slices to manipulate. The selection hierarchy 260 may also allow the user to select multiple segments at one time to view. The selection hierarchy 260 may allow users to change whether individual layers are visible in one of the 3D views. The selection hierarchy 260 may be displayed as a tree or as a list, with different hierarchy levels indented to different degrees. In upper levels of the selection hierarchy 260, users may be able to expand or collapse lists or sub-lists of items lower in the hierarchy. For example, a user may be able to click a tab next to a slice to view all of the segments within the slice, and click on the tab again to hide the segments from view. In some cases, upon receiving a user input via the selection hierarchy 260, a display of the corresponding 3D object in the object display 240 may be updated.

The command queue 270 may show commands selected by a user that have yet to be processed by the application synchronously. The command queue 270 may allow the user to operate the visualization window 200 while commands are being executed. For example, a user may perform a compute-intensive operation on an entire print job, such as an affine scaling transformation in the x, y, and z-directions by 200%. While the operation executes, the user may decide to perform a partitioning command on the entire job after the affine scaling transformation has completed. The user may enter the partitioning instruction into the command queue 270, and the partitioning instruction may be executed following the affine scaling transformation.

The command history 280 may include one or more instructions, or commands, which modify states of the 3D object or one of its sub-components, such as one of its pieces, slices, or segments. The final command in the command history 280 may reflect a final state of the object as it is to be printed, as a result of the compounding of all of the previous states. Commands may be entered by a user manually. Commands may include creating a new slice, viewing a slice, performing an ordering operation (manual or auto-ordering), partitioning a slice into segments (either manually or using an algorithm), or performing a seek operation. The commands may be labeled with a type of command, the job that the command is for, and a timestamp. The command history 280 may show a list of errors or warnings that may occur during a printing operation, and may not allow a user to proceed with printing unless these errors are addressed. A particular command instance may be given an identifier, such as a number. A command may be a function that has one or more arguments, such as user ID, job ID, the traceable set targeted for that command, and the value of the "Trace After" switch.

The seek command, in particular, may be used to backtrack to an earlier modified state of the 3D object. When a seek command is performed on a selected instruction, the object may revert to a state corresponding to the selected instruction. The seek command may be saved in the command history 280. Additional entered commands may modify the object in the reverted-to state. This may create a branched set of instructions, with the original branch containing the original sequence of commands, and the new branch including the original commands up to and including the state to which the seek command was applied, as well as all subsequent commands. The seek command is an instruction itself, and thus is saved in the command history 280 after it executes.

Figure 2B:
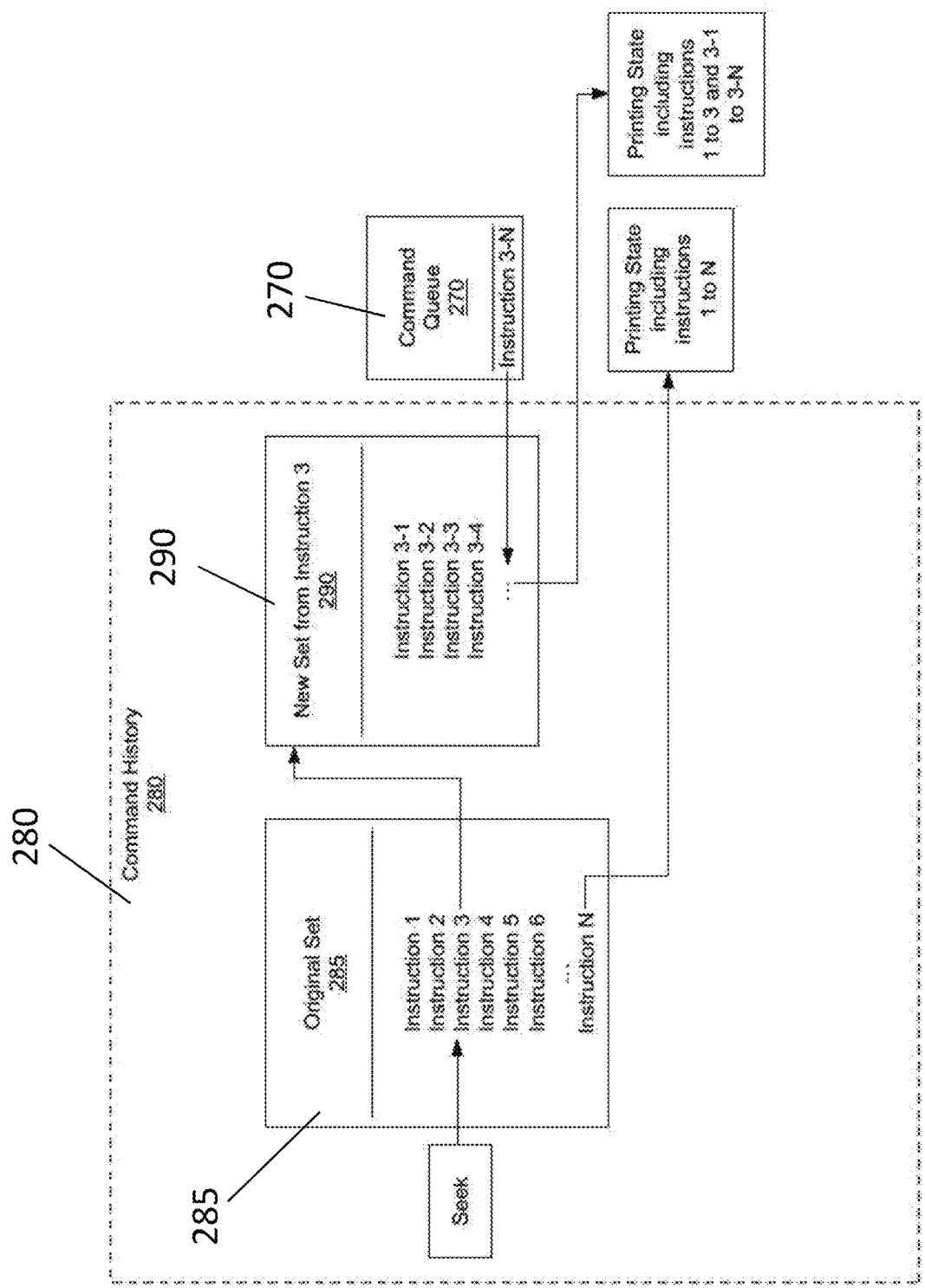
FIG. 2B illustrates an example of the seek command.

FIG. 2B illustrates an example of the seek command. FIG. 2B includes an original set of instructions 285 and a new set of instructions 290 within the command history 280. The original set includes a first set of instructions. The user performs a seek command on instruction 3 of this first set. This creates the new set of instructions. Subsequent instructions, starting from 3-1, are derived from instruction 3. An additional instruction 3-N is entered into the command queue 270, and enters the command history 280 after it is executed. If the first set of instructions 285 had been implemented without having performed the seek command, the printing state would be a state reached by performing each of the instructions one through N on the 3D object. But since the seek command was performed, the printing state reached is the state from performing instructions one through 3 and then 3-1 through 3-N on the 3D object. Additional sets of instructions may be created by performing the seek command on any instruction in either set.

Figure 3:
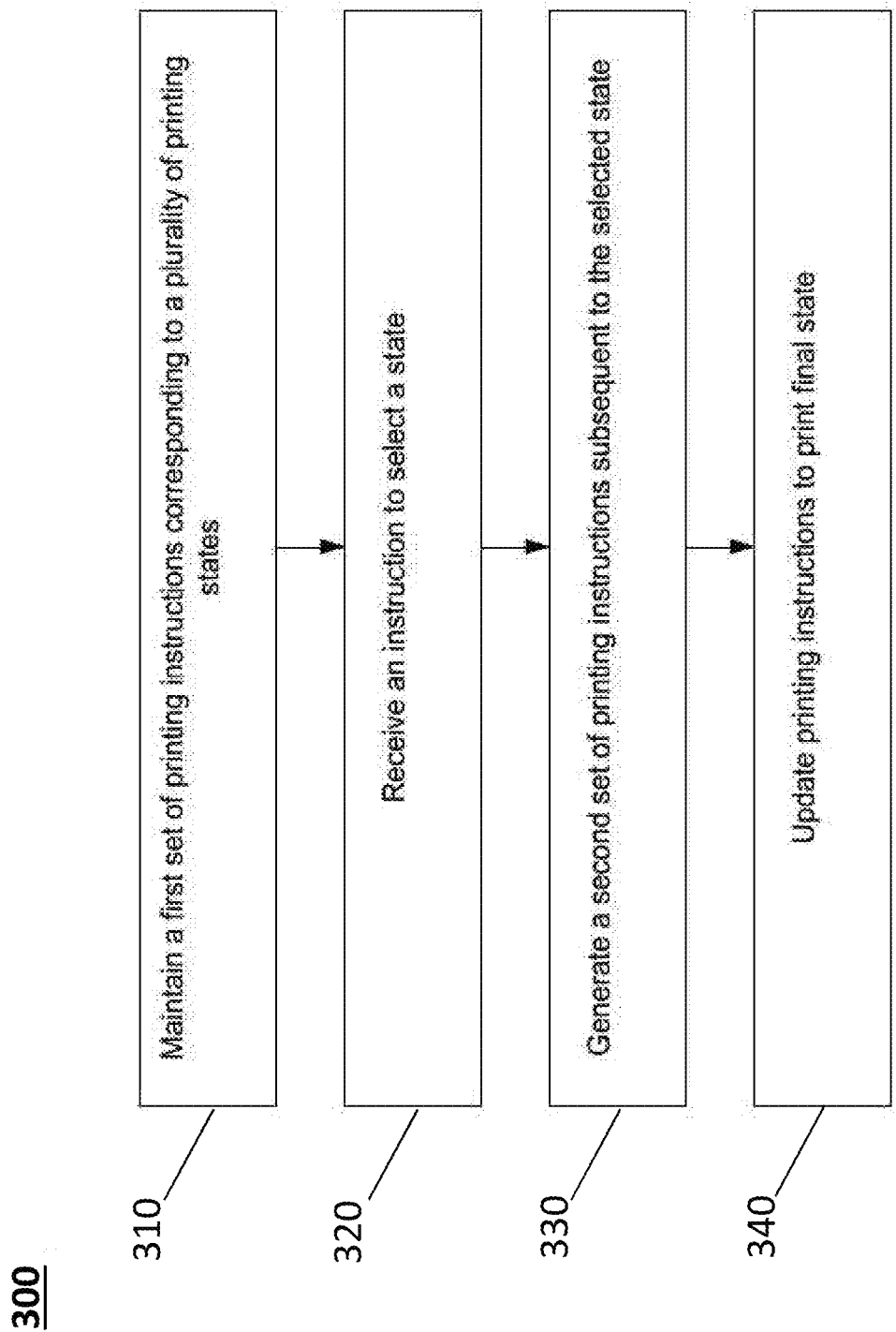
FIG. 3 illustrates a method for generating multiple sets of instructions using the display visualization window of FIG. 2A.

FIG. 3 illustrates a method 300 for generating multiple sets of instructions using the visualization window 200 of FIG. 2A. In the disclosed method, command branches may be made using the seek command. A user may be free to select any state from any branch by selecting an instruction from the command history 280 of the visualization window 200.

In a first operation 310, a computer program including the visualization window 200 maintains a plurality of printing states corresponding to a plurality of printing instructions usable by the 3D printer for printing a 3D object. The maintained plurality of printing instructions may comprise a first set of printing instructions. The individual printing instructions may be arranged in the command history 280 in a specific order. For example, the instructions may be ordered by timestamp. Early instructions may be listed at the bottom of the command history 280 and later instructions are listed higher, with a final instruction in the command history 280 listed at the top. An instruction may correspond to a printing state of the 3D object. Thus, the printing states may be linked in a deterministic fashion. This implies that, for a particular 3D object, a particular set of instructions may result in a particular state, each time that particular set of instructions is applied to the particular part. For example, a first instruction may partition a slice into a set of polygonal segments, and then a second instruction may automatically set a printing order for the segments. The partition caused by the first instruction may use specific criteria to partition the slice. Applying different criteria prior to executing the first instruction may result in a different partition. Applying the same second instruction to this different partition may change the automatic ordering of segments.

In a second operation 320, the command history 280 in the visualization window 200 receives an instruction to select a state of the plurality of states. The state may not be the final state. This may occur when a user wishes to undo a command or a set of commands and start a set of operations from a preceding command. For example, a user may not like a particular printing order of segments or a particular partitioning of a 3D piece. The user may wish to re-split the part or change the order in which segments are printed. The user may select the state by providing user input via the command history. For instance, the user may use the seek command function to select a state corresponding to a traceable command. The user may select an instruction from the command history 280 and use the seek command to bypass all instructions subsequent to the selected instruction. This method of undoing all subsequent instructions may be implemented on any instruction that is not the final instruction. If the user selects the final instruction corresponding to the final state, the command history 280 may continue adding instructions to the first set of instructions instead of creating a second set of instructions.

In a third operation 330, the visualization window 200 may generate a new state comprising a second set of one or more printing instructions usable by the 3D printer to print a second portion of the 3D object. The second portion of the 3D object at least partially overlaps with the first portion. The user may create an instruction using the command queue 270, forming a state that is linked deterministically to the state corresponding to the selected instruction from the second step. All subsequent instructions may be linked back to the selected instruction. This effectively creates a second branching set of instructions in the command history 280.

In a fourth operation 340, the visualization window 200 of FIG. 2A may update the plurality of printing instructions with the second set of one or more printing instructions in computer memory, to yield an updated plurality of printing instructions including the first set of printing instructions and the second set of printing instructions. Thus, a final instruction that produces a final printing state of the 3D object may be derived directly from the selected instruction. If the user wishes to undo any of these commands, the user may use the seek command on any instruction in the command history 280 and enter additional instructions using the command queue 270. This may create a new set of instructions which may be used to produce another final printing state.

In FIG. 2B, the command history 280 maintains two sets of instructions, a branch starting at command 1 and an additional branch starting from command 3. Using the command queue 270, a user executes command 3-N, which is added to the branch starting from command 3 in the command history 280. The current printing state contains commands 1-3 and 3-1 to 3-N.

Figure 4A:
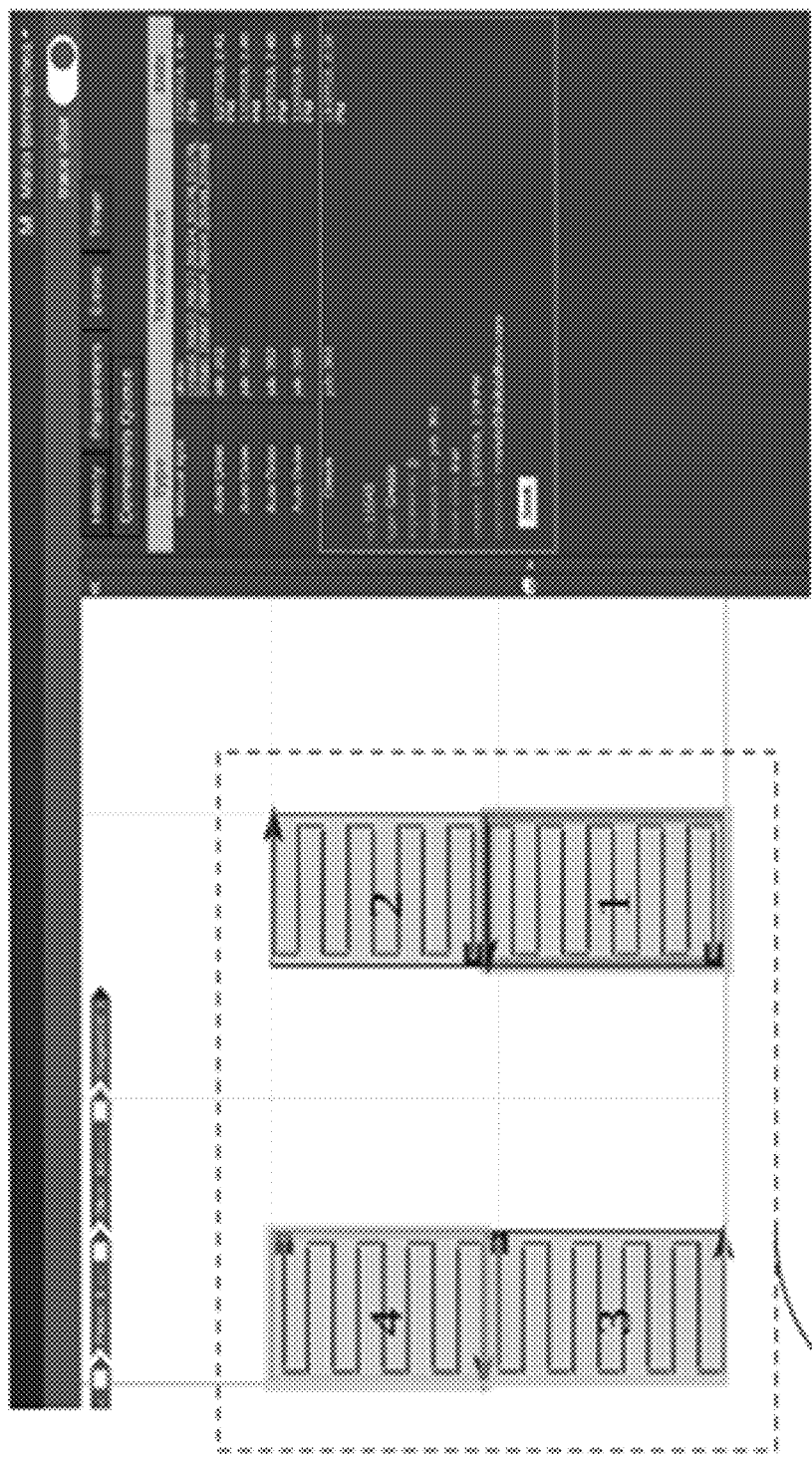
FIGS. 4A and 4B show an example of a backtracking operation using the seek command, used to create two sets of printing instructions.
Figure 4B:
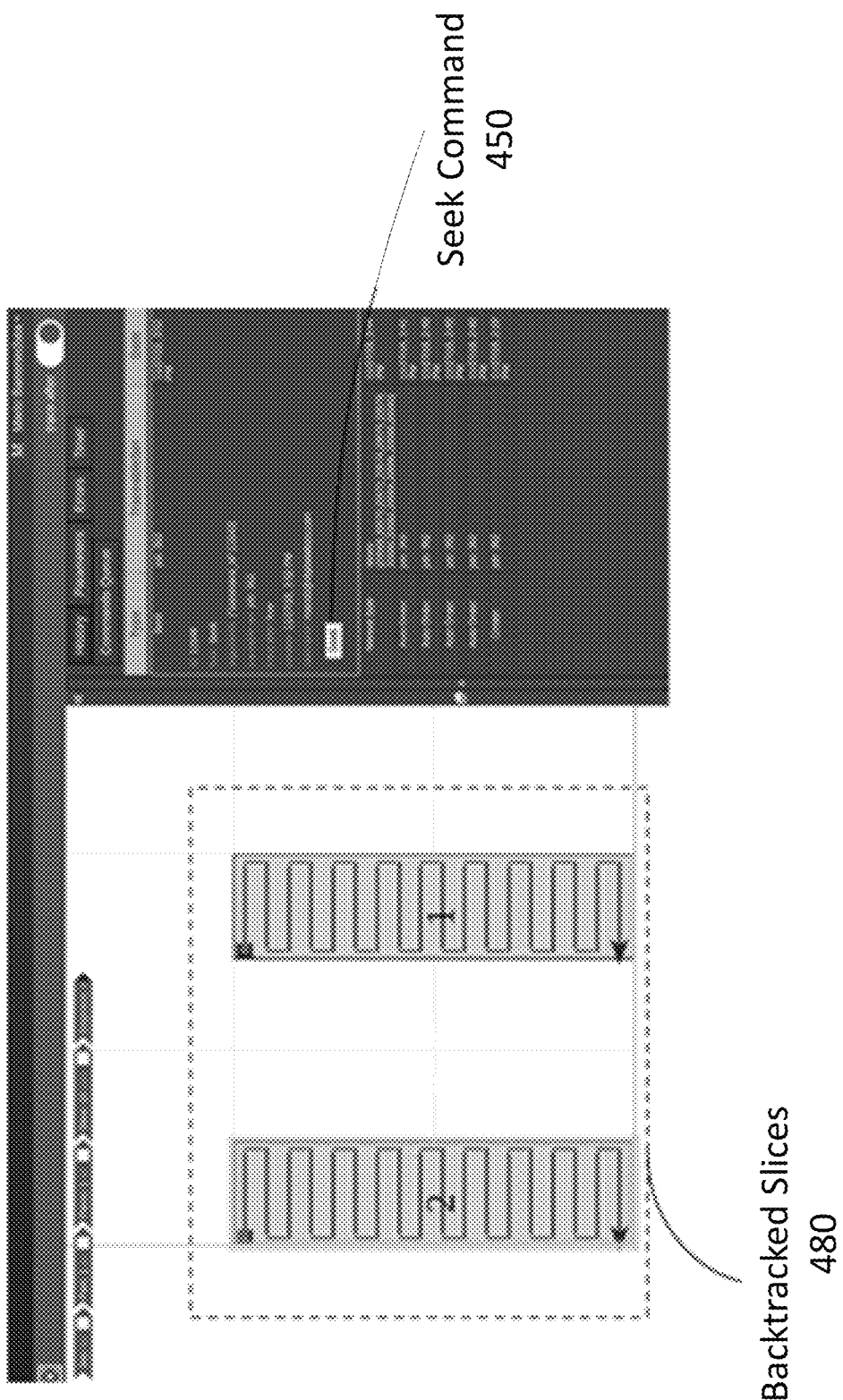

FIGS. 4A and 4B show an example of a backtracking operation using the seek command, used to create two sets of printing instructions. FIG. 4A shows an automatically ordered (e.g., placed in a printing order) set of segments 420 in the object display 240 of FIG. 2A, and indicates a final printing state for the 3D object. The object display 240 presents four segments of two slices in a 2D view, with their toolpaths indicated by arrows. These segments were ordered using a greedy algorithm, where a next segment printed contains a start point (square) closest to a most recently printed segment's endpoint (arrowhead). The segments in FIG. 4A may belong to one slice or may be segments from different slices. Although the segments in FIG. 4A are rectangular, the segments may be of any two-dimensional shape. In the command history 280, an instruction with ID 11543 is selected. The selected instruction has a seek button in the bottom-right corner. If this seek button is selected, executing a seek command, the segments may revert to their states from before the automatic ordering and partitioning instructions were executed.

FIG. 4B shows an illustration of a seek command 450 being performed on the segments in the display of FIG. 4A. The seek command 450 reverted the segments to their configurations following execution of a previous "create" command, into backtracked slices 480. The backtracked slices 480 have not been partitioned into four segments, and their order is distinct from that of the automatically ordered segments 420 of FIG. 4A. In addition, the seek command 450 is added to the end of the command history 280 of FIGS. 2A and 2B. Subsequent instructions modifying the configurations of the slices branch from the previous "create" command, unless another seek operation is performed, reverting the printing state of the segments to one of the printing states listed after (on top of) the previous "create" command.

FIG. 4B shows arguments of the seek command 450, including the ID of the "create" command 11543, indicating a specific "create" command instance the state of the 3D object has been reverted to. In general, command parameters may be set using a command data model with key-value pairs, such as a hash, a map, or a graph. Key-value pairs may represent data fields linked to a command data model and may be of various data types including integer, string, date, or even foreign keys to other data models in the slicer database. Other fields listed by the command model may include the job identifier, username of the user performing the operation, and a timestamp.

Display Techniques

Figure 5:
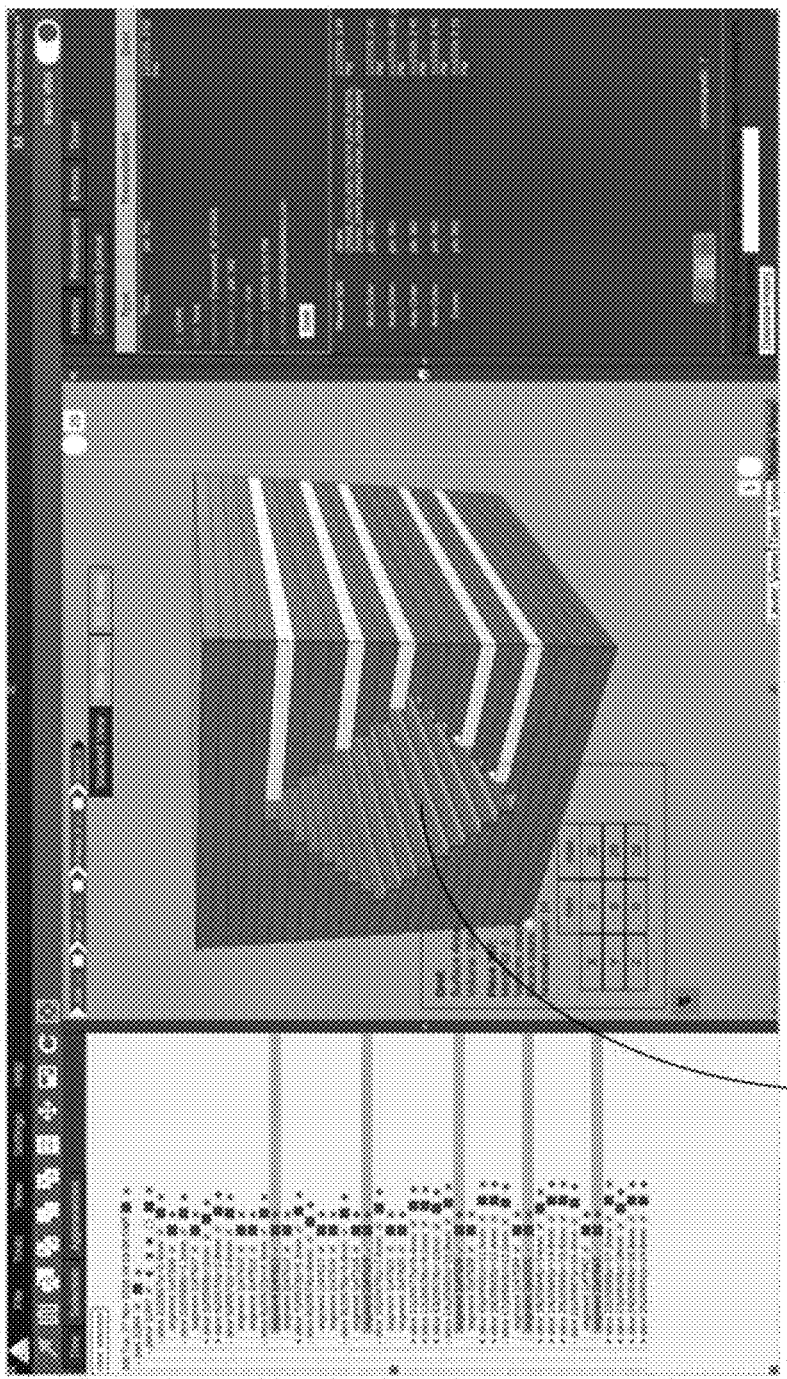
FIG. 5 shows an example of a stacked view.

FIG. 5 shows an example of a stacked view 550. In the stacked view 550, users may select multiple slices or segments, which are highlighted in the object display 240 of FIG. 2A. In the command history 280 of FIG. 2A, instructions may be saved which operate upon multiple 3D object components (pieces, slices, and segments) simultaneously. Slices shaded more lightly in the stacked view 550 are the selected slices, which were split in a "manual split" instruction visible in the command history 280. These slices were also present in the layer view, but the layers towards the bottom of the object were hidden from view. The object display 240 shows data about the 3D object, such as the number of faces, number of vertices, volume, and surface area.

Figure 6:
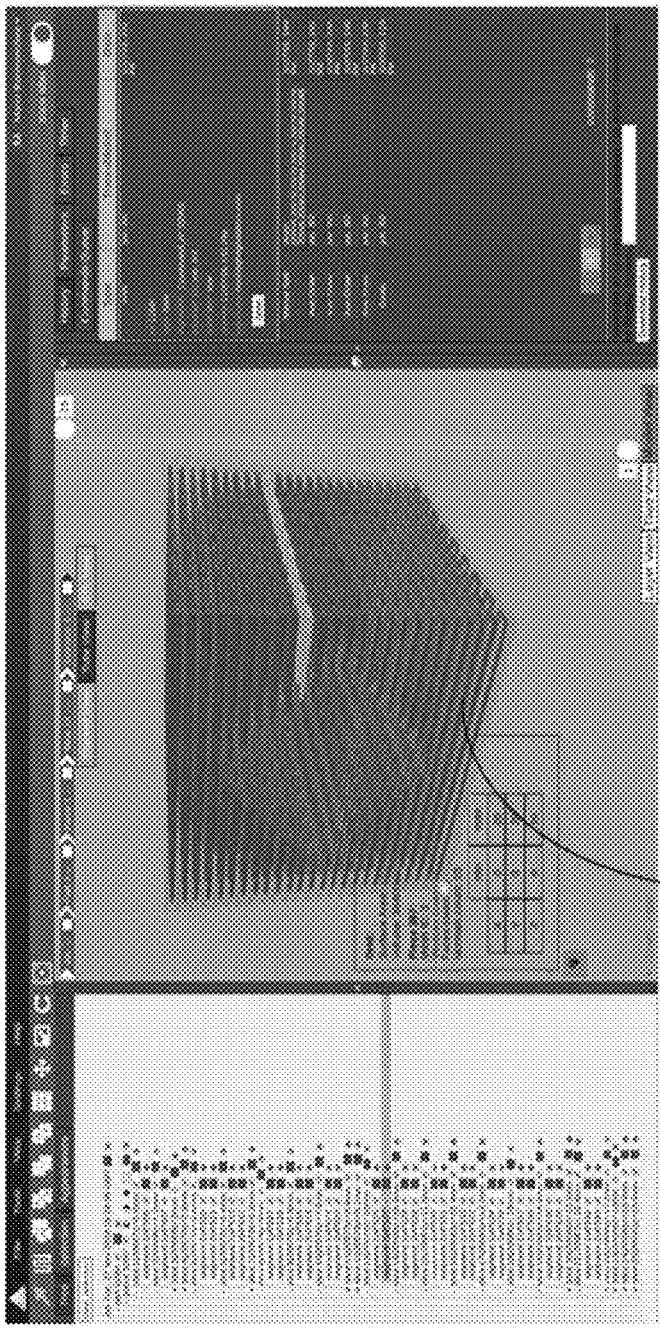
FIG. 6 shows an example of a tube view.

FIG. 6 shows an example of a tube view 650. The tube view 650 shows a set of stacked toolpaths. The lightly colored toolpath is highlighted in the selection hierarchy. Like the stacked view, the tube view also shows characteristics of the 3D object. Notably, in the selection hierarchy, all of the segments are expanded, as their toolpaths are all shown in tube view.

Figure 7:
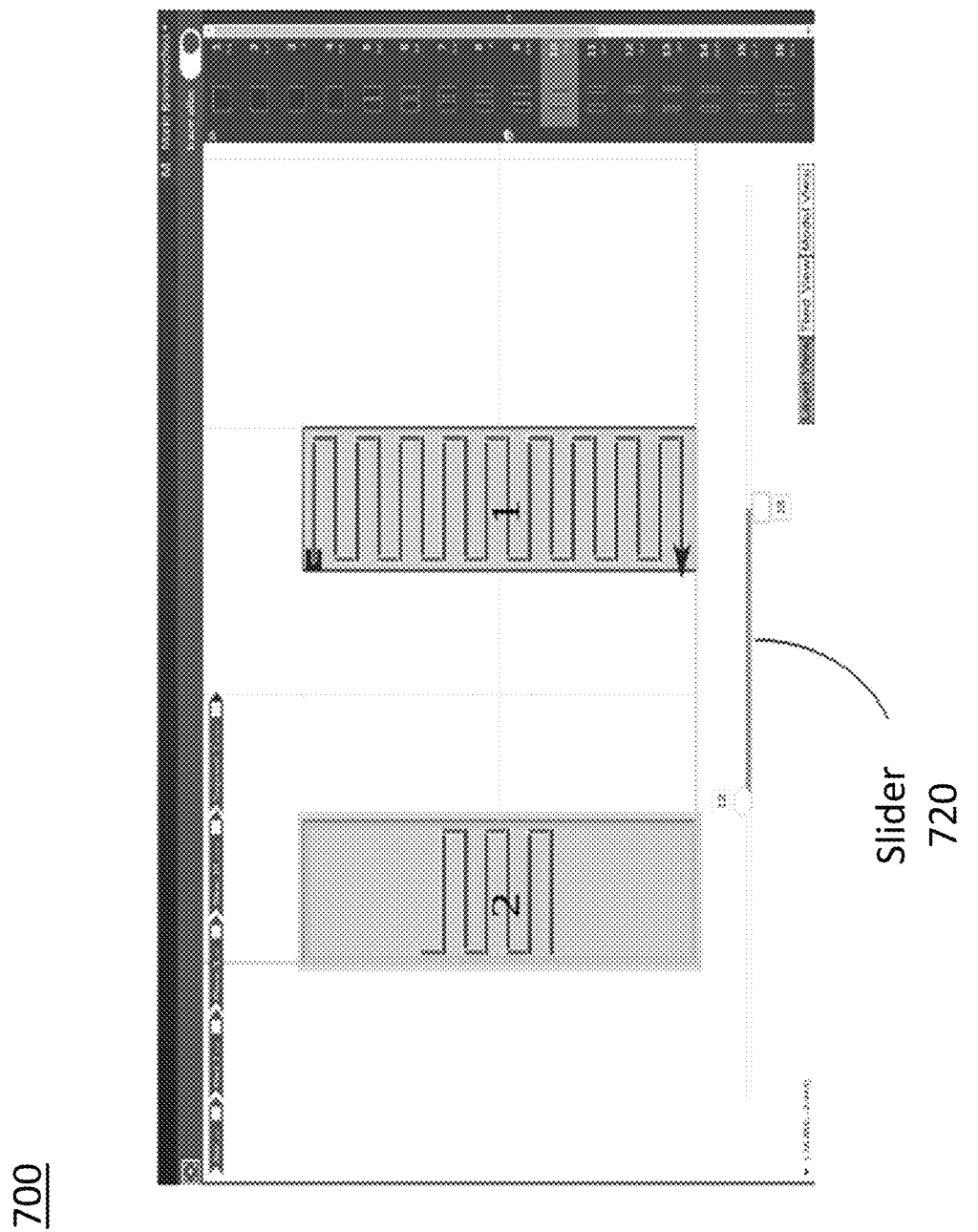
FIG. 7 shows an example of selecting a specific section of toolpath.

FIG. 7 shows an example 700 of selecting a specific section of toolpath. Specific sections of toolpaths may be manipulated using the command history 280 of FIG. 2A as well as slices and segments. The sections may change direction or take on different paths or shapes. Portions of the toolpath may be selected using a slider 720 at the bottom of the object display 240 of FIG. 2A. For example, the display of the objects may be dynamically updated while the slider is adjusted.

Computer Systems

Figure 8:
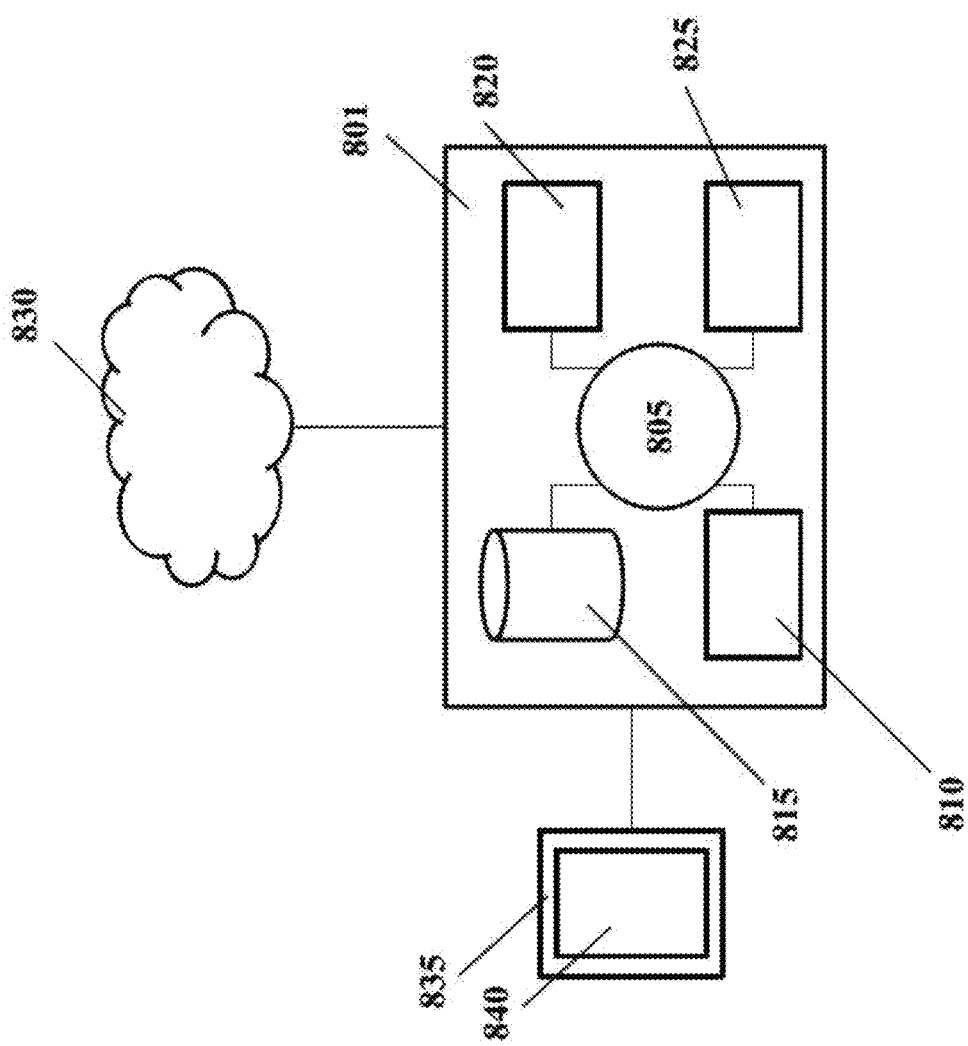
FIG. 8 shows a computer system that is programmed or otherwise configured to implement methods provided herein.

The present disclosure provides computer systems that are programmed to implement methods of the disclosure. FIG. 8 shows a computer system 801 that is programmed or otherwise configured to implement software for generating instructions to print a 3D object. The computer system 801 can regulate various aspects of maintaining multiple instruction sets of the present disclosure, such as, for example, visualizing the 3D object, storing sets of instructions, creating branching sets of instructions, and maintaining a hierarchy of object components. The computer system 801 can be an electronic device of a user or a computer system that is remotely located with respect to the electronic device. The electronic device can be a mobile electronic device.

The computer system 801 includes a central processing unit (CPU, also "processor" and "computer processor" herein) 805, which can be a single core or multi core processor, or a plurality of processors for parallel processing. The computer system 801 also includes memory or memory location 810 (e.g., random-access memory, read-only memory, flash memory), electronic storage unit 815 (e.g., hard disk), communication interface 820 (e.g., network adapter) for communicating with one or more other systems, and peripheral devices 825, such as cache, other memory, data storage and/or electronic display adapters. The memory 810, storage unit 815, interface 820 and peripheral devices 825 are in communication with the CPU 805 through a communication bus (solid lines), such as a motherboard. The storage unit 815 can be a data storage unit (or data repository) for storing data. The computer system 801 can be operatively coupled to a computer network ("network") 830 with the aid of the communication interface 820. The network 830 can be the Internet, an internet and/or extranet, or an intranet and/or extranet that is in communication with the Internet. The network 830 in some cases is a telecommunication and/or data network. The network 830 can include one or more computer servers, which can enable distributed computing, such as cloud computing. The network 830, in some cases with the aid of the computer system 801, can implement a peer-to-peer network, which may enable devices coupled to the computer system 801 to behave as a client or a server.

The computer memory may be configured to maintain sets of instructions, including an initial first set of instructions. These instructions may be entered as commands by a user, and may correspond to printing states. The computer processors may be configured to receive instructions, for example, from users, and select instructions in order to create a second set of instructions corresponding to a second set of printing states.

The CPU 805 can execute a sequence of machine-readable instructions, which can be embodied in a program or software. The instructions may be stored in a memory location, such as the memory 810. The instructions can be directed to the CPU 805, which can subsequently program or otherwise configure the CPU 805 to implement methods of the present disclosure. Examples of operations performed by the CPU 805 can include fetch, decode, execute, and writeback.

The CPU 805 can be part of a circuit, such as an integrated circuit. One or more other components of the system 801 can be included in the circuit. In some cases, the circuit is an application specific integrated circuit (ASIC).

The storage unit 815 can store files, such as drivers, libraries and saved programs. The storage unit 815 can store user data, e.g., user preferences and user programs. The computer system 801 in some cases can include one or more additional data storage units that are external to the computer system 801, such as located on a remote server that is in communication with the computer system 801 through an intranet or the Internet.

The computer system 801 can communicate with one or more remote computer systems through the network 830. For instance, the computer system 801 can communicate with a remote computer system of a user (e.g., another user of a 3D printer). Examples of remote computer systems include personal computers (e.g., portable PC), slate or tablet PC's (e.g., Apple® iPad, Samsung® Galaxy Tab), telephones, Smart phones (e.g., Apple® iPhone, Android-enabled device, Blackberry®), or personal digital assistants. The user can access the computer system 801 via the network 830.

Methods as described herein can be implemented by way of machine (e.g., computer processor) executable code stored on an electronic storage location of the computer system 801, such as, for example, on the memory 810 or electronic storage unit 815. The machine executable or machine readable code can be provided in the form of software. During use, the code can be executed by the processor 805. In some cases, the code can be retrieved from the storage unit 815 and stored on the memory 810 for ready access by the processor 805. In some situations, the electronic storage unit 815 can be precluded, and machine-executable instructions are stored on memory 810.

The code can be pre-compiled and configured for use with a machine having a processer adapted to execute the code, or can be compiled during runtime. The code can be supplied in a programming language that can be selected to enable the code to execute in a pre-compiled or as-compiled fashion.

Aspects of the systems and methods provided herein, such as the computer system 1101, can be embodied in programming. Various aspects of the technology may be thought of as "products" or "articles of manufacture" typically in the form of machine (or processor) executable code and/or associated data that is carried on or embodied in a type of machine readable medium. Machine-executable code can be stored on an electronic storage unit, such as memory (e.g., read-only memory, random-access memory, flash memory) or a hard disk. "Storage" type media can include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer into the computer platform of an application server. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

Hence, a machine readable medium, such as computer-executable code, may take many forms, including but not limited to, a tangible storage medium, a carrier wave medium or physical transmission medium. Non-volatile storage media include, for example, optical or magnetic disks, such as any of the storage devices in any computer(s) or the like, such as may be used to implement the databases, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a ROM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a processor for execution.

The computer system 801 can include or be in communication with an electronic display 835 that comprises a user interface (UI) 840 for providing, for example, instructions for printing a 3D object using a 3D printer. Examples of UIs include, without limitation, a graphical user interface (GUI) and web-based user interface.

Methods and systems of the present disclosure can be implemented by way of one or more algorithms. An algorithm can be implemented by way of software upon execution by the central processing unit 805. The algorithm can, for example, generate 3D printing instructions.

Methods and systems of the present disclosure may be used with various types of three-dimensional printing, such as the three-dimensional printing methods and systems described in U.S. Pat. No. 10,029,406, which is entirely incorporated herein by reference.

Methods for Displaying a Plurality of Cross-Sections of a Three-Dimensional Object In an aspect, a computer-implemented method for displaying a plurality of cross-sections of a three-dimensional (3D) object, which plurality of cross-sections is usable by a 3D printer to print the 3D object, may comprise using one or more computer processors. The one or more computer processer may be used to receive a computer model of the 3D object and use at least the computer model to generate the plurality of cross-sections of the 3D object. The plurality of cross-sections may comprise a plurality of toolpaths usable by the 3D printer to print at least a portion of the 3D object, wherein the plurality of cross-sections comprise a cross-section and one or more additional cross-sections, and wherein the cross-section and the one or more additional cross-sections are vertically oriented with respect to one another. Next, the computer-implemented method for displaying a plurality of cross-sections of the 3D object may present the plurality of cross-sections comprising the plurality of toolpaths in a navigational panel of a user interface on an electronic display operatively coupled to the one or more computer processors, wherein the plurality of cross-sections are presented in order of increasing vertical distance away from the cross-section.

The number of plurality of cross-sections of the 3D object may be at least about 1, 2, 3, 4, 5, 6, 7, 8, 9, 10, or greater. The number of plurality of cross-section of the 3D object may be at most about 20, 15, 10, 9, 8, 7, 6, 5, 4, 3, 2, 1, or less. The 3D object may be based on a computer model of the 3D object, such as a computer-aided design (CAD) stored in a computer readable storage medium (e.g., medium). The computer readable storage medium may comprise CD-ROMs, DVDs, flash memory devices, solid state memory, magnetic disk drives, magnetic tape drives, optical disk drives, cloud computing systems and services, and the like. The computer model may be permanently, substantially permanently, semi-permanently, or non-transitorily encoded on the media. As an alternative, the 3D object may not be based on any computer model.

The number of plurality of toolpaths of the 3D object may be at least about 1, 2, 3, 4, 5, 6, 7, 8, 9, 10, or greater. The number of plurality of toolpaths of the 3D object may be at most about 20, 15, 10, 9, 8, 7, 6, 5, 4, 3, 2, 1, or less. The toolpath on a given cross-section may represent a route that a 3D printer follows to print a 3D object across the given cross-section. The toolpath on the given cross-section may cover the whole given cross-section. In some cases, the toolpath on the given cross-section may cover a portion of the given cross-section. If the toolpath covers a portion of the given cross-sections, the area of coverage may be at least about 10%, 20%, 30%, 40%, 50%, 60%, 70%, 80%, 90% or greater of the area of the given cross-section. In some cases, the area of coverage may be at most about 90%, 80%, 70%, 60%, 50%, 40%, 30%, 20%, 10% or less of the area of the given cross section.

The printing process may be performed according to a method for printing at least a portion of a 3D object. The method may comprise printing the 3D object through a layer-by-layer fabrication of a three-dimensional metallic structure upon an electrically conductive support or base. A first layer of the structure may be formed by depositing a plurality of metal segments onto the base. Each metal segment may be deposited by (i) disposing a feedstock (e.g., metal wire) in contact with the base, and (ii) passing an electrical current through the feedstock and the base. A portion of the feedstock may melt to form the metal segment on the base. This may be performed by resistive heating (e.g., Joule heating). Heat generated at a local area at the contact between the feedstock and the support may be sufficient to melt a tip of the feedstock into a segment and to fuse the segment to the base. The heat may be generated by resistive heating (e.g., Joule heating). One or more subsequent layers of the structure may be formed by depositing pluralities of metal segments over the first layer of the structure. Each metal segment may be deposited by (i) disposing the feedstock in contact with a deposited metal segment, and (ii) passing an electrical current through the feedstock, the deposited metal segment, and the base. A portion of the feedstock may melt to form the metal segment on the deposited metal segment. Such printing may be performed using methods and systems described in, for example, U.S. Pat. No. 10,029,406, which is entirely incorporated herein by reference.

In some examples, the segment is a strand or a particle, which strand or particle may be molten. Upon deposition of the segment on the support, the segment may act as a second electrode in an electric circuit to melt and print additional segments of the feedstock. The heat generated at the local area may be sufficient to melt the tip of the feedstock into a segment and to fuse the segment to a segment on the support. The heat generated at the local area may be sufficient to melt the tip of the feedstock into a segment and to fuse the segment to one or more neighboring segments. As such, segments of the feedstock may be deposited without use or generation of electric arcs and/or plasma, but rather by utilizing energy (e.g., electrical energy) within the feedstock. The energy within the feedstock may be used to (i) melt at least a portion of the feedstock and (ii) print and/or repair at least a portion of the 3D object.

The tip of the feedstock may melt while the feedstock is in contact with the support and the feedstock and the support are moving relative to one another. For example, the feedstock is moving and the support is stationary. As another example, the feedstock is stationary and the support is moving (e.g., along a plane orthogonal to a longitudinal axis of the support perpendicular to the support). As another example, both the feedstock and the support are moving (e.g., along a plane orthogonal to a longitudinal axis of the support perpendicular to the support).

The printing process may be performed through a system for printing at least a portion of the 3D object adjacent to a support. The system may comprise a support for holding at least the portion of the 3D object, a source for holding at least one wire, one or more sensors to measure a reaction force of the support against the at least one wire, and a power supply for flowing electrical current through the at least one wire and the support. The wire may be used for the printing of the at least the portion of the 3D object. Furthermore, a controller may be operatively coupled to the power supply. The controller may be configured to direct a first portion of the at least one wire toward and in contact with the support using at least one contact parameter. Upon contacting the at least one wire with the support, one or more sensors may be used to measure the reaction force exerted by the support against the first portion of the at least one wire. The contact parameter may be adjusted when the reaction force exceeds a threshold value to provide an adjusted contact parameter. Next, a second portion of the at least one wire may be directed toward and in contact with the support using the adjusted contact parameter.

The plurality of cross-sections may comprise a cross-section and one or more additional cross-sections. The cross section of the plurality of cross-sections may be in any design, shape, or size. Examples of possible shapes or designs include but are not limited to: mathematical shapes (e.g., circular, triangular, square, rectangular, pentagonal, or hexagonal), two-dimensional geometric shapes, multi-dimensional geometric shapes, curves, polygons, polyhedral, polytopes, minimal surfaces, ruled surfaces, non-orientable surfaces, quadrics, pseudospherical surfaces, algebraic surfaces, miscellaneous surfaces, riemann surfaces, box-drawing characters, cuisenaire rods, geometric shapes, shapes with metaphorical names, symbols, unicode geometric shapes, other geometric shapes, or partial shapes or combination of shapes thereof.

The cross-section and the one or more additional cross-sections may be vertically oriented with respect to one another. The cross-section and the one or more additional cross-sections may be horizontally oriented with respect to one another. The number of one or more additional cross-sections may be at least about 1, 2, 3, 4, 5, 6, 7, 8, 9, 10, or greater. The number of one or more additional cross-sections may be at most about 20, 15, 10, 9, 8, 7, 6, 5, 4, 3, 2, 1, or less.

The computer-implemented method for displaying a plurality of cross-sections of a 3D object may next present the plurality of cross-sections comprising the plurality of toolpaths in a navigational panel of a user interface on an electronic display operatively coupled to the one or more computer processors. The electronic display may be operatively coupled with an electronic device. The electronic display may be integrated with an electronic device. The one or more computer processors may be operatively coupled with an electronic device. The one or more computer processors may be integrated with an electronic device. The electronic device may be a portable electronic device. The electronic device may be mobile phones, PCs, tablets, printers, consumer electronics, a wearable device or appliances. The electronic display may be a display screen. The display screen may include a front-facing screen that may include a touch interface. The display screen may be a liquid crystal display, similar to a tablet computer. The display screen may be accompanied by one or more speakers, and may be configured for providing visual and audial instructions to a user. The display screen may be a touch screen. The touch screen may comprise a color screen. The touch screen can allow for multi-touch gestures. The touch screen can allow for calibration or correct for differences in finger size.

The plurality of cross-sections may be presented in order of increasing vertical distance away from the cross-section. The plurality of cross-sections may be presented in order of decreasing vertical distance towards the cross-section. The plurality of cross-sections may be presented in order of increasing horizontal distance away from the cross-section. The plurality of cross-sections may be presented in order of decreasing horizontal distance towards the cross-section.

The method may further comprise receiving a selection of a given cross-section of the plurality of cross-sections, and receiving a request to perform a 3D printer toolpath-related or 3D object-related command on the given cross-section. The 3D printer toolpath-related or 3D object-related command may comprise selecting at least one sub-section of the given cross-section. The area of the sub-section may be at least about 10%, 20%, 30%, 40%, 50%, 60%, 70%, 80%, 90% or greater of the area of the given cross section. The area of the sub-section may be at most about 100%, 95%, 90%, 80%, 70%, 60%, 50%, 40%, 30%, 20%, 10% or less of the area of the given cross section.

The at least one sub-section may comprise at least one toolpath that is removed upon receiving the request. The at least one sub-section may comprise at least about 2, 3, 4, 5, 6, 7, 8, 9, or greater toolpaths that are removed upon receiving the request. The at least one sub-section may comprise at most about 20, 15, 10, 9, 8, 7, 6, 5, 4, 3, 2, or less toolpath that are removed upon receiving the request.

The 3D printer toolpath-related or 3D object-related command may comprise selecting at least two sub-sections of the plurality of cross-sections and merging the at least two sub-sections. The 3D printer toolpath-related or 3D object-related command may comprise selecting at least about 3, 4, 5, 6, 7, 8, 9 or greater sub-sections of the plurality of cross-sections and merging the selected sub-sections. The 3D printer toolpath-related or 3D object-related command may comprise selecting at most about 20, 15, 10, 9, 8, 7, 6, 5, 4, 3 or less sub-sections of the plurality of cross-sections and merging the selected sub-sections.

The method may further comprise presenting in the user interface the selection of the given cross-section of the plurality of cross-sections. The selection of the given cross-section of the plurality of cross-sections may be presented on an electronic display. The electronic display may be a display screen. The display screen may include a front-facing screen that may include a touch interface. The display screen may be a liquid crystal display, similar to a tablet computer. The display screen may be accompanied by one or more speakers, and may be configured for providing visual and audial instructions to a user. The display screen may be a touch screen. The touch screen may comprise a color screen. The touch screen can allow for multi-touch gestures. The touch screen can allow for calibration or correct for differences in finger size.

The 3D printer toolpath-related or 3D object-related command may comprise presenting alternative plurality of toolpaths of the plurality of cross-sections, wherein the alternative plurality of toolpaths are different from the plurality of toolpaths. The alternative plurality of toolpaths may be used by the 3D printer to print the 3D object faster. The alternative plurality of toolpaths may allow the 3D printer to print the 3D object with less printing materials.

The generating the plurality of cross-sections of the 3D object may further comprise ordering the plurality of cross-sections along a fundamental length scale of the 3D object. The fundamental length scale may comprise partial height of the 3D object. For instance, the fundamental length scale may comprise at least about 10%, 20%, 30%, 40%, 50%, 60%, 70%, 80%, 90% or greater of height of the 3D object. In another example, the fundamental length scale may comprise at most about 100%, 95%, 90%, 80%, 70%, 60%, 50%, 40%, 30%, 20%, 10% or less of height of the 3D object. As an alternative, the fundamental length scale may comprise partial width or length of the 3D object.

The method may further comprise highlighting at least one of the plurality of cross-sections (i) based at least in part on user input in the navigational panel of the user interface or (ii) at least in response to a 3D printer toolpath-related or 3D object-related command on a given cross-section of the plurality of cross-sections. The user input may comprise the user's selection of the cross-sections or sub-sections of the cross-sections. The navigational panel may present symbols of all the cross-sections of the 3D object. The navigational panel may present symbols of part of the cross-sections of the 3D object. The navigational panel may be mobile or fixed. Alternatively, or in addition to, the navigational panel may be mobile (e.g., movable around the screen) or fixed in a single location. The navigational panel may be positioned at the right side of the electronic display, the left side of the electronic display, the top half of the electronic display, the bottom half of the electronic display, the top of the electronic display, the middle of the electronic display, or the bottom of the electronic display.

The method may further comprise highlighting at least one sub-section of a given cross-section of the plurality of cross-sections (i) based at least in part on user input in the navigational panel of the user interface or (ii) at least in response to a 3D printer toolpath-related or 3D object-related command on the given cross-section of the plurality of cross-sections. The user input may comprise the user's selection of the sub-sections of the cross-sections. The navigational panel may present symbols of all the sub-sections of the 3D object. The navigational panel may present symbols of part of the sub-sections of the 3D object. The area of a given sub-section of the at least one sub-section may be at least about 10%, 20%, 30%, 40%, 50%, 60%, 70%, 80%, 90% or greater of the area of the given cross section. The area of a given sub-section of the at least one sub-section may be at most about 100%, 95%, 90%, 80%, 70%, 60%, 50%, 40%, 30%, 20%, 10% or less of the area of the given cross section.

The method may further comprise using the plurality of cross-sections to generate 3D printer instructions for printing the 3D object. The 3D printer instructions may be any suitable programming language comprising assembly language, Ada, APL, Basic, C, C++, C*, COBOL, dBase, Forth, FORTRAN, Java, Modula-2, Pascal, Prolog, Python, REXX, or JavaScript.

In another aspect, a computer-implemented method for displaying a plurality of cross-sections of a three-dimensional (3D) object, which plurality of cross-sections is usable by a 3D printer to print the 3D object, may first comprise using one or more computer processors to receive a computer model of the 3D object and use at least the computer model to generate the plurality of cross-sections of the 3D object. The plurality of cross-sections may comprise a plurality of toolpaths usable by the 3D printer to print at least a portion of the 3D object, wherein the plurality of cross-sections comprises a cross-section and one or more additional cross-sections, and wherein the cross-section and the one or more additional cross-sections are vertically oriented with respect to one another. Second, the method may comprise presenting the plurality of cross-sections comprising the plurality of toolpaths in a navigational panel of a user interface on an electronic display operatively coupled to the one or more computer processors. Third, the method may comprise receiving, from the user interface, a request to adjust at least one toolpath of the cross-section of the plurality of cross-sections. Fourth, upon receiving the request, the method may comprise adjusting one or more toolpaths of at least a subset of the one or more additional cross-sections in accordance with the at least one toolpath adjusted in the third step.

The method may further comprise presenting in the user interface the one or more toolpaths adjusted in the fourth step. The one or more toolpaths may comprise at least about 1, 2, 3, 4, 5, 6, 7, 8, 9, 10 toolpaths. The one or more toolpaths may comprise at most about 20, 15, 10, 9, 8, 7, 6, 5, 4, 3, 2, or less toolpaths. The toolpath on a given cross-section may represent a route that the 3D printer follows to print a 3D object across the given cross-section. The toolpath on the given cross-section may cover the whole given cross-section. In some cases, the toolpath on the given cross-section may cover a portion of the given cross-section.

The adjusting in third step may comprise removing at least one toolpath of the cross-section of the plurality of cross-sections. The adjusting in fourth step may comprise removing the one or more toolpaths of the at least the subset of the one or more additional cross-sections. The at least one sub-section may comprise at least about 2, 3, 4, 5, 6, 7, 8, 9, or greater toolpaths that is removed upon receiving the request. The at least one sub-section may comprise at most about 20, 15, 10, 9, 8, 7, 6, 5, 4, 3, 2, or less toolpath that is removed upon receiving the request.

The adjusting in third step may comprise changing at least one toolpath of the cross-section of the plurality of cross-sections. The changed at least one toolpath may be used by the 3D printer to print the 3D object faster. The changed at least one toolpath may allow the 3D printer to print the 3D object with less printing materials. The adjusting in the fourth step may comprise changing the one or more toolpaths of the at least the subset of the one or more additional cross-sections. The changed one or more toolpaths may be used by the 3D printer to print the 3D object faster. The changed one or more toolpaths may allow the 3D printer to print the 3D object with less printing materials.

The generating in first step may further comprise ordering the plurality of cross-sections along a fundamental length scale of the 3D object. The fundamental length scale may comprise partial height of the 3D object. For instance, the fundamental length scale may comprise at least about 10%, 20%, 30%, 40%, 50%, 60%, 70%, 80%, 90% or greater of height of the 3D object. In another example, the fundamental length scale may comprise at most about 100%, 95%, 90%, 80%, 70%, 60%, 50%, 40%, 30%, 20%, 10% or less of height of the 3D object. As an alternative, the fundamental length scale may comprise partial width or length of the 3D object.

The method may further comprise highlighting at least one of the plurality of cross-sections (i) based at least in part on user input in the navigational panel of the user interface or (ii) at least in response to a 3D printer toolpath-related or 3D object-related command on a given cross-section of the plurality of cross-sections. The user input may comprise the user's selection of the cross-sections or sub-sections of the cross-sections. The navigational panel may present symbols of all the cross-sections of the 3D object. The navigational panel may present symbols of part of the cross-sections of the 3D object. The navigational panel may be mobile or fixed. Alternatively, or in addition to, one or more of the navigational panel may be mobile (e.g., movable around the screen) or fixed in a single location. The navigational panel may be positioned at the right side of the electronic display, the left side of the electronic display, the top half of the electronic display, the bottom half of the electronic display, the top of the electronic display, the middle of the electronic display, or the bottom of the electronic display.

The method may further comprise highlighting at least one sub-section of a given cross-section of the plurality of cross-sections (i) based at least in part on user input in the navigational panel of the user interface or (ii) at least in response to a 3D printer toolpath-related or 3D object-related command on a given cross-section of the plurality of cross-sections. The user input may comprise the user's selection of sub-sections of the cross-sections. The navigational panel may present symbols of all the sub-sections of the 3D object. The navigational panel may present symbols of part of the sub-sections of the 3D object. The area of the sub-section may be at least about 10%, 20%, 30%, 40%, 50%, 60%, 70%, 80%, 90% or greater of the area of the given cross section. The area of the sub-section may be at most about 100%, 95%, 90%, 80%, 70%, 60%, 50%, 40%, 30%, 20%, 10% or less of the area of the given cross section.

The method may further comprise using the plurality of cross-sections to generate 3D printer instructions for printing the 3D object. The 3D printer instructions may be any suitable programming language comprising assembly language, Ada, APL, Basic, C, C++, C*, COBOL, dBase, Forth, FORTRAN, Java, Modula-2, Pascal, Prolog, Python, REXX, or JavaScript.

The method may further comprise using the 3D printer instructions by the 3D printer to print the 3D object. The printing may be performed by a system. The system may be described as elsewhere herein.

Systems for Displaying a Plurality of Cross-Sections of a Three-Dimensional (3D) Object In an aspect, a system for displaying a plurality of cross-sections of a three-dimensional (3D) object, which plurality of cross-sections is usable by a 3D printer to print the 3D object, may comprise computer memory storing a computer model of the 3D object and one or more computer processors. The one or more computer processors may be operatively coupled to the computer memory. The one or more computer processors may be individually or collectively programmed to (i) receive the computer model of the 3D object from the computer memory, (ii) use at least the computer model to generate the plurality of cross-sections of the 3D object, wherein the plurality of cross-sections comprise a plurality of toolpaths usable by the 3D printer to print at least a portion of the 3D object, wherein the plurality of cross-sections comprise a cross-section and one or more additional cross-sections, and wherein the cross-section and the one or more additional cross-sections are vertically oriented with respect to one another, and (iii) provide the plurality of cross-sections comprising the plurality of toolpaths for display in a navigational panel of a user interface on an electronic display operatively coupled to the one or more computer processors, wherein the plurality of cross-sections are presented in order of increasing vertical distance away from the cross-section.

In another aspect, a system for displaying a plurality of cross-sections of a three-dimensional (3D) object, which plurality of cross-sections is usable by a 3D printer to print the 3D object, may comprise computer memory storing a computer model of the 3D object and one or more computer processors. The one or more computer processors may be operatively coupled to the computer memory. The one or more computer processors may be individually or collectively programmed to (i) receive the computer model of the 3D object from the computer memory; (ii) use at least the computer model to generate the plurality of cross-sections of the 3D object, wherein the plurality of cross-sections comprise a plurality of toolpaths usable by the 3D printer to print at least a portion of the 3D object, wherein the plurality of cross-sections comprises a cross-section and one or more additional cross-sections, and wherein the cross-section and the one or more additional cross-sections are vertically oriented with respect to one another; (iii) provide the plurality of cross-sections comprising the plurality of toolpaths for display in a navigational panel of a user interface on an electronic display operatively coupled to the one or more computer processors; (iv) receive, from the user interface, a request to adjust at least one toolpath of the cross-section of the plurality of cross-sections; and (v) upon receiving the request, adjust one or more toolpaths of at least a subset of the one or more additional cross-sections in accordance with the at least one toolpath adjusted in (iv).

The number of plurality of cross-sections of the 3D object may be at least about 1, 2, 3 4, 5, 6, 7, 8, 9, 10, or greater. The number of plurality of cross-section of the 3D object may be at most about 20, 15, 10, 9, 8, 7, 6, 5, 4, 3, 2, 1, or less. The 3D object may be based on a computer model of the 3D object, such as a computer-aided design (CAD) stored in a computer readable storage medium (e.g., medium). The computer readable storage medium may comprise CD-ROMs, DVDs, flash memory devices, solid state memory, magnetic disk drives, magnetic tape drives, optical disk drives, cloud computing systems and services, and the like. The computer model may be permanently, substantially permanently, semi-permanently, or non-transitorily encoded on the media. As an alternative, the 3D object may not be based on any computer model.

The number of plurality of toolpaths of the 3D object may be at least about 1, 2, 3, 4, 5, 6, 7, 8, 9, 10, or greater. The number of plurality of toolpaths of the 3D object may be at most about 20, 15, 10, 9, 8, 7, 6, 5, 4, 3, 2, 1, or less. The toolpath on a given cross-section may represent the route that the 3D printer follows to print a 3D object across the given cross-section. The toolpath on the given cross-section may cover the whole given cross-section. In some cases, the toolpath on the given cross-section may cover a portion of the given cross-section.

The printing process may be performed according to a method for printing at least a portion of a 3D object. The method for printing at least a portion of a 3D object may be described as elsewhere herein. The printing process may be performed through a system for printing at least a portion of the 3D object adjacent to a support. The system for printing at least a portion of the 3D object adjacent to a support may be described as elsewhere herein.

The system for displaying a plurality of cross-sections of a 3D object may be able to present the plurality of cross-sections comprising the plurality of toolpaths in a navigational panel of a user interface on an electronic display operatively coupled to the one or more computer processors. The electronic display may be operatively coupled with an electronic device. The electronic display may be integrated with an electronic device. The one or more computer processors may be operatively coupled with an electronic device. The one or more computer processors may be integrated with an electronic device. The electronic device may be a portable electronic device. The electronic device may be mobile phones, PCs, tablets, printers, consumer electronics, a wearable device or appliances. The electronic display may be a display screen. The display screen may include a front-facing screen that may include a touch interface. The display screen may be a liquid crystal display, similar to a tablet computer. The display screen may be accompanied by one or more speakers, and may be configured for providing visual and audial instructions to a user. The display screen may be a touch screen. The touch screen may comprise a color screen. The touch screen can allow for multi-touch gestures. The touch screen can allow for calibration or correct for differences in finger size.

The plurality of cross-sections may be presented in order of increasing vertical distance away from the cross-section. The plurality of cross-sections may be presented in order of decreasing vertical distance towards the cross-section. The plurality of cross-sections may be presented in order of increasing horizontal distance away from the cross-section. The plurality of cross-sections may be presented in order of decreasing horizontal distance towards the cross-section.

The system for displaying a plurality of cross-sections of a 3D object may be able to present in the user interface the selection of the given cross-section of the plurality of cross-sections. The selection of the given cross-section of the plurality of cross-sections may be presented on an electronic display. The electronic display may be a display screen. The display screen may include a front-facing screen that may include a touch interface. The display screen may be a liquid crystal display, similar to a tablet computer. The display screen may be accompanied by one or more speakers, and may be configured for providing visual and audial instructions to a user. The display screen may be a touch screen. The touch screen may comprise a color screen. The touch screen can allow for multi-touch gestures. The touch screen can allow for calibration or correct for differences in finger size.

Figure 9:
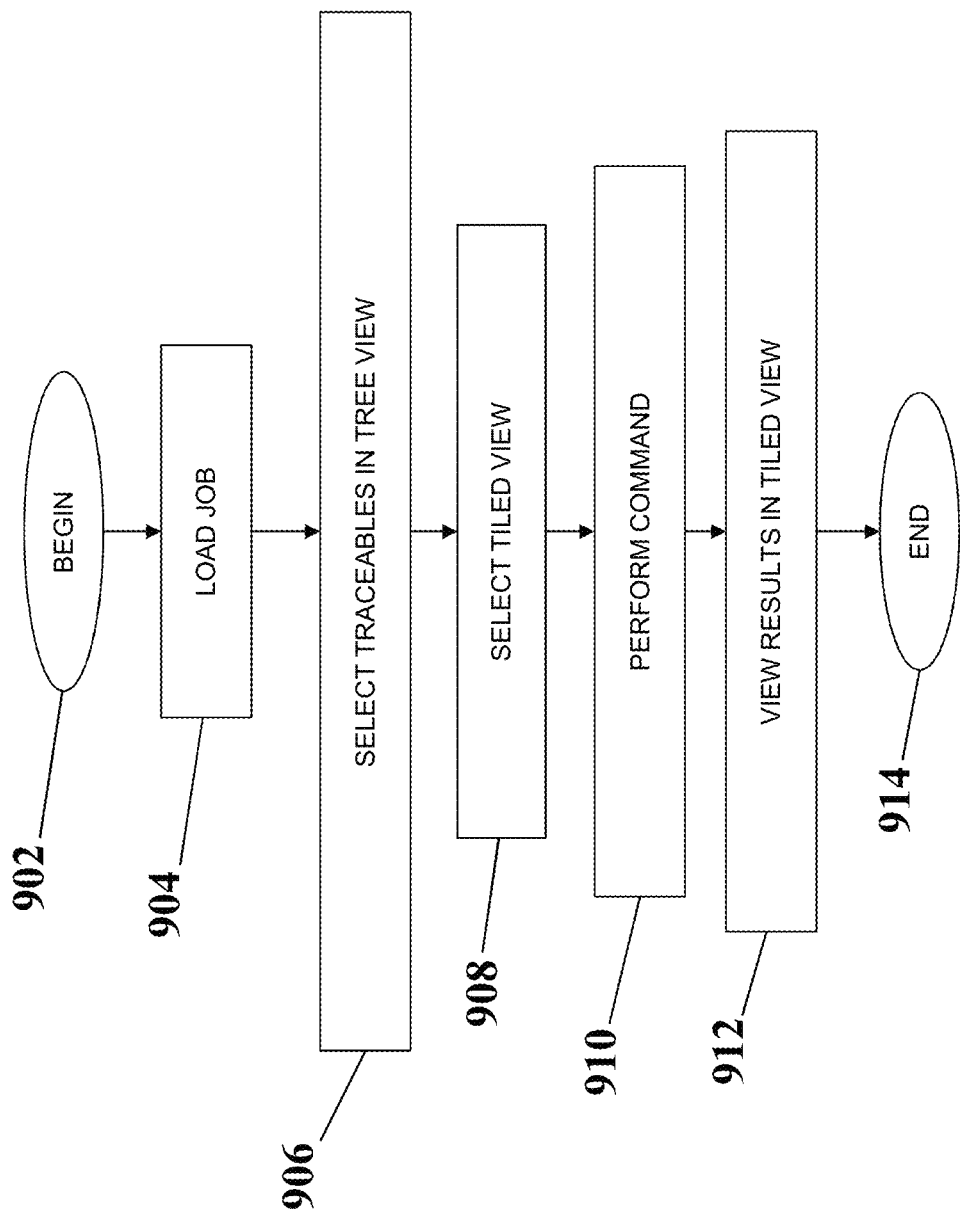
FIG. 9 shows an example of a flow chart for viewing and displaying a three-dimensional object.

FIG. 9 shows an example of a flow chart for viewing and displaying a 3D object. The flow chart may show a method of displaying a plurality of cross-sections of a 3D object. The method may first begin 902 loading job 904. The loading job 904 may comprise loading a 3D object that is about to be printed. Next, the method may comprise selecting traceables in tree view 906. The traceables 906 may comprise one or more cross-sections of the 3D object. The traceable 906 may comprise one or more sub-sections or toolpaths of a given cross-section of the 3D object. The method may further comprise selecting tiled views (cross-sections) 908. After selecting tiled views 908, the method may further comprise performing one or more commands 910. The one or more commands may comprise a 3D printer toolpath-related or 3D object-related command. Next, the method may comprise viewing the results in tiled view window 912. The results may be obtained after the commands are performed. The method may then end 914 the whole process.

Figure 10:
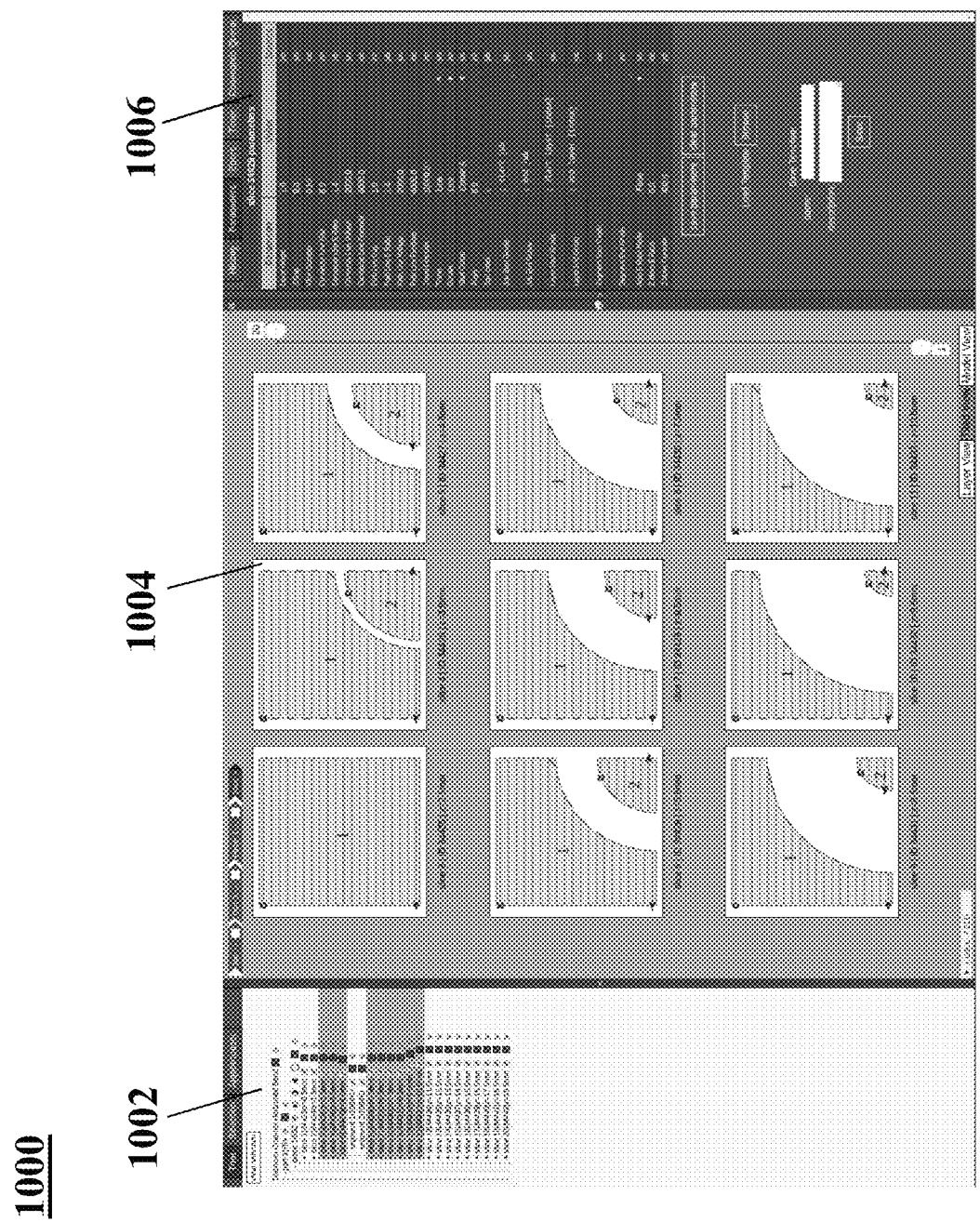
FIG. 10 shows an example of viewing multiple layers in a graphical user interface.

FIG. 10 shows an example of viewing multiple layers in a graphical user interface. The graphical user interface 1000 may demonstrate a navigational panel 1002, a tiled view window 1004, and a parameter panel 1006. The navigational panel 1002 may allow the user to select cross-sections (tiled views) among a plurality of cross-sections. The tiled view window 1004 may demonstrate the selected cross-sections. For instance, in the tiled view window 1004, the demonstrated cross-sections are vertically oriented with respect to one another. In the tiled view window 1004, a user can select layer view or model view. The parameter panel 1006 may demonstrate the parameters related to the selected cross-sections. The parameters may comprise the positions of the cross-sections in the 3D object and the size of a given cross-section.

Figure 11:
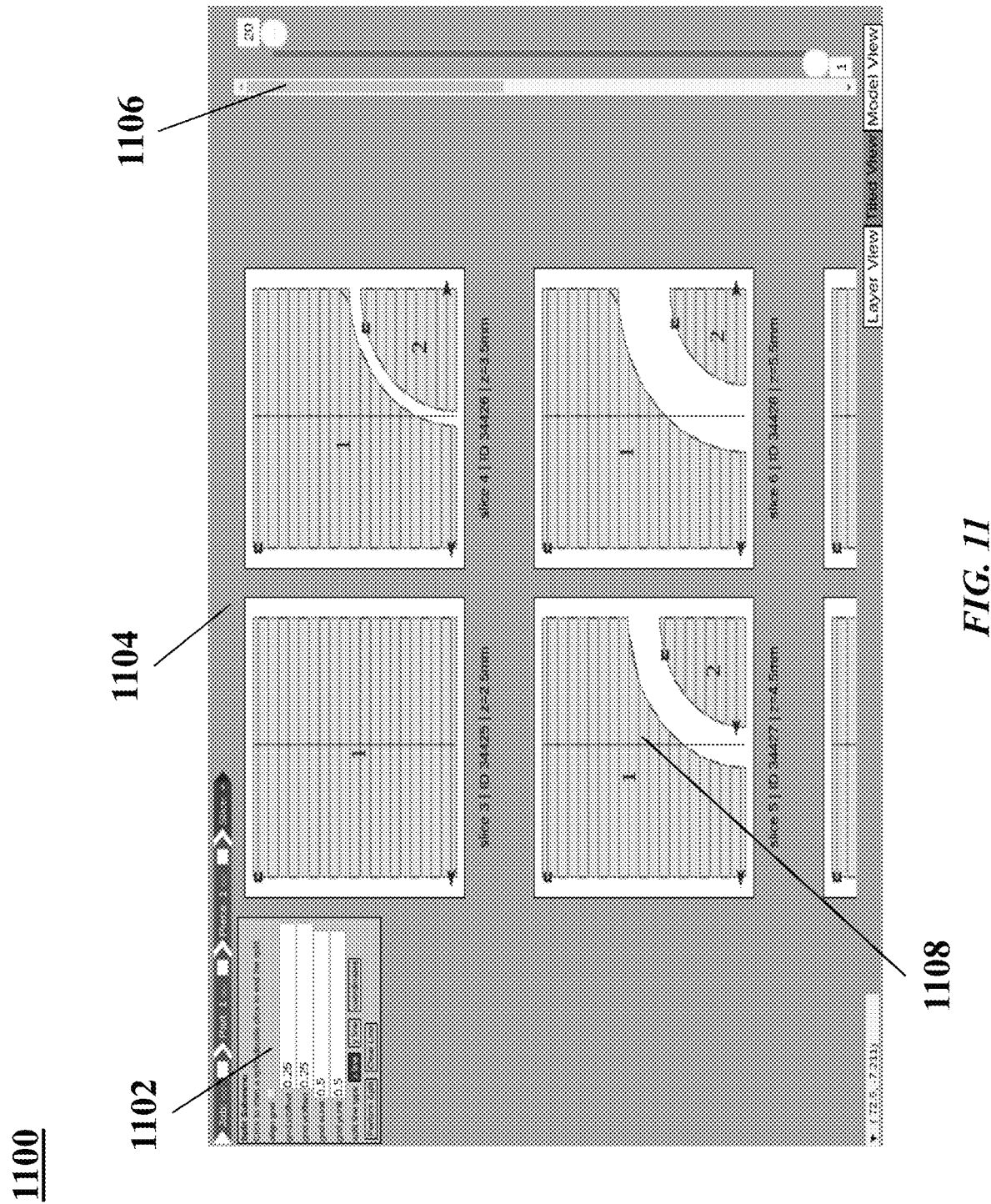
FIG. 11 shows an example of previewing a line split in the graphical user interface.

FIG. 11 shows an example of previewing a line split in the graphical user interface. The graphical user interface 1100 may demonstrate an information panel 1102, a tiled view window 1104, and a vertical scroll bar 1106. The information panel 1102 may allow the user to see the information regarding selected cross-sections (tiled views) among a plurality of cross-sections. For instance, the information may comprise split line type (x line or y line). The tiled view window 1104 may demonstrate the selected cross-sections. For instance, in the tiled view window 1104, the demonstrated cross-sections are 4 adjacent cross-sections vertically oriented with respect to one another. In each of the 4 adjacent cross-sections presented in the tiled view window 1104, the split line 1108 is in the middle of the cross-section. In the tiled view window 1104, a user can select layer view or model view. The vertical scroll bar 1106 may allow the user to survey all selected cross-sections or toolpaths even if they do not fit on the screen.

Figure 12:
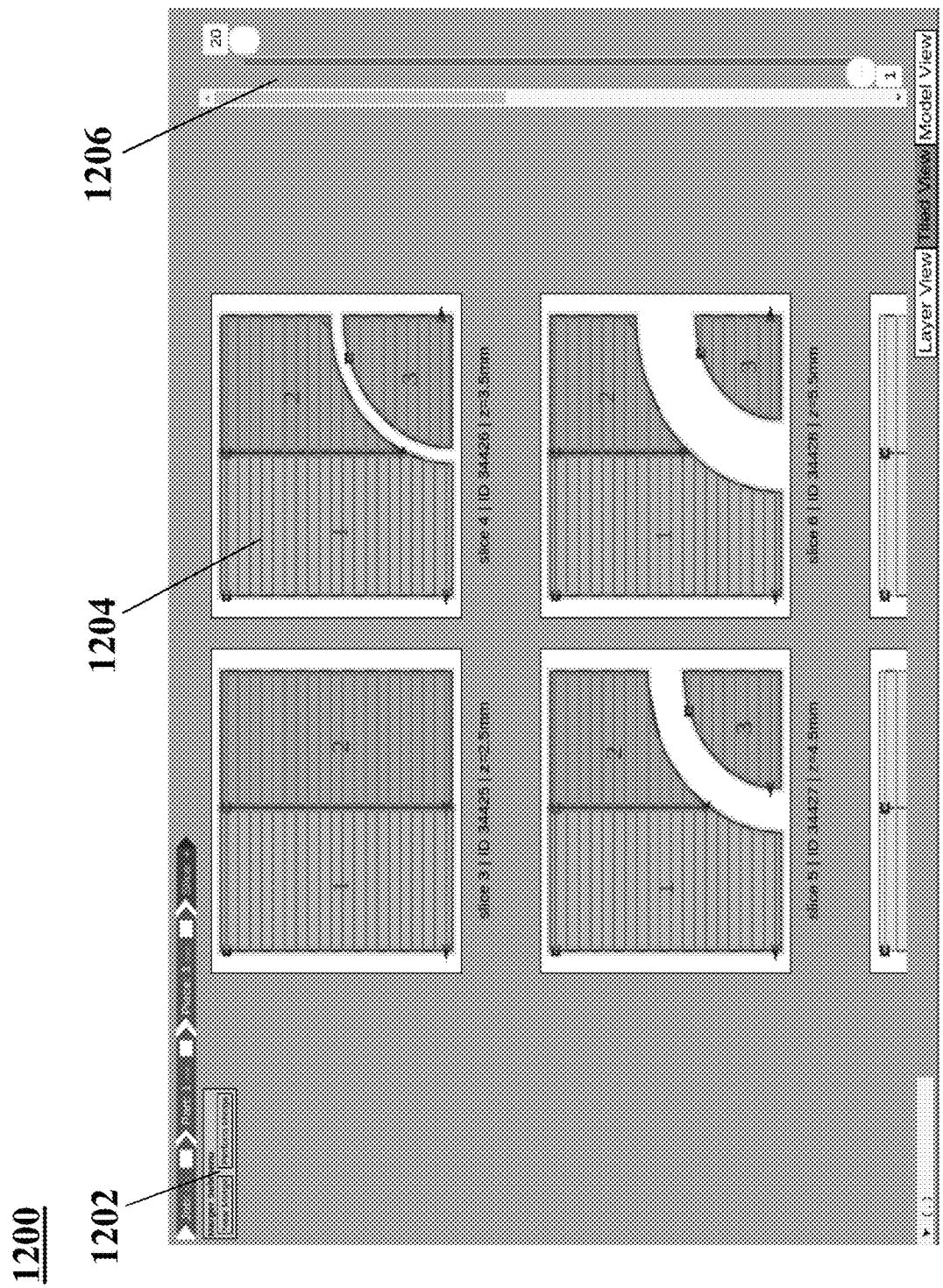
FIG. 12 shows an example of previewing a segment merge across multiple layers in the graphical user interface.

FIG. 12 shows an example of previewing a segment merge across multiple layers in a graphical user interface. The graphical user interface 1200 may demonstrate a merge submenu 1202, a tiled view window 1204, and a vertical scroll bar 1206. The merger submenu 1202 may demonstrate different actions that can be performed during merge, including "new merge" or "perform merge." The tiled view window 1204 may demonstrate selected cross-sections of a plurality of cross-sections of a 3D object. For instance, in the tiled view window 1204 demonstrated, the selected cross-sections are 4 adjacent cross-sections vertically oriented with respect to one another. In the tiled view window 1204, a user can select layer view or model view. Each of the selected cross-sections may comprise three portions, marked as 1, 2, 3 in each of the cross-sections. The vertical scroll bar 1206 may allow the user to survey all selected cross-sections or toolpaths even if they do not fit on the screen.

The present disclosure provides computer systems that are programmed to implement methods of the disclosure. The computers systems can be the same as those described in FIG. 8. For example, a computer system 801 is programmed or otherwise configured to displaying a plurality of cross-sections of a three-dimensional (3D) object. The computer system 801 can regulate various aspects of the present disclosure, such as, for example, receiving a computer model of a 3D object, using at least the computer model to generate a plurality of cross-sections of the 3D object, and presenting the plurality of cross-sections. The computer system 801 can be an electronic device of a user or a computer system that is remotely located with respect to the electronic device. The electronic device can be a mobile electronic device.

The computer system 801 can include or be in communication with an electronic display 835 that comprises a user interface (UI) 840 for providing, for example, a plurality of cross-sections of a 3D object. Examples of UI's include, without limitation, a graphical user interface (GUI) and web-based user interface.

Methods and systems of the present disclosure can be implemented by way of one or more algorithms. An algorithm can be implemented by way of software upon execution by the central processing unit 805. The algorithm can, for example, remove selected sub-sections of a given cross-section of a 3D object.

While preferred embodiments of the present invention have been shown and described herein, it will be obvious to those skilled in the art that such embodiments are provided by way of example only. It is not intended that the invention be limited by the specific examples provided within the specification. While the invention has been described with reference to the aforementioned specification, the descriptions and illustrations of the embodiments herein are not meant to be construed in a limiting sense. Numerous variations, changes, and substitutions will now occur to those skilled in the art without departing from the invention. Furthermore, it shall be understood that all aspects of the invention are not limited to the specific depictions, configurations or relative proportions set forth herein which depend upon a variety of conditions and variables. It should be understood that various alternatives to the embodiments of the invention described herein may be employed in practicing the invention. It is therefore contemplated that the invention shall also cover any such alternatives, modifications, variations or equivalents. It is intended that the following claims define the scope of the invention and that methods and structures within the scope of these claims and their equivalents be covered thereby.

What is claimed is:

1. A method for updating a plurality of printing instructions for a three-dimensional (3D) printer, comprising:
   (a) maintaining a plurality of printing states corresponding to said plurality of printing instructions usable by said 3D printer for printing a 3D object, wherein a first state of said plurality of printing states corresponds to a first set of one or more printing instructions of said plurality of printing instructions usable by said 3D printer to print a first portion of said 3D object, wherein said plurality of printing states comprises a final state corresponding to one or more final printing instructions of said plurality of printing instructions;
   (b) receiving one or more user instructions to select a second state of said plurality of printing states, wherein said second state is not said final state;
   (c) generating a new state comprising a second set of one or more printing instructions usable by said 3D printer to print a second portion of said 3D object, wherein said second set of one or more printing instructions usable by said 3D printer to print said second portion of said 3D object at least partially overlaps with said first set of one or more printing instructions usable by said 3D printer to print said first portion of said 3D object; and
   (d) updating said plurality of printing instructions with said second set of one or more printing instructions in computer memory, to yield an updated plurality of printing instructions.

2. The method of claim 1, wherein in (b) said one or more user instructions are received via a user interface.

3. The method of claim 1, wherein in (a), said plurality of printing instructions is provided in a command history.

4. The method of claim 3, wherein in (a), said command history is provided by a user.

5. The method of claim 1, further comprising, subsequent to (d), directing said updated plurality of printing instructions or derivative thereof to said 3D printer to print said 3D object.

6. The method of claim 1, wherein said plurality of printing instructions comprise an operation selected from the group consisting of creating a segment, ordering a segment, and splitting a segment.

7. The method of claim 1, wherein said 3D object is viewable as a set of stacked segments.

8. The method of claim 1, wherein said 3D object is viewable as a set of stacked toolpaths.

9. The method of claim 1, wherein individual slices of a model of said 3D object are selected and processed using at least said plurality of printing instructions.

10. The method of claim 1, wherein individual segments of slices of a model of said 3D object are selected and processed using at least said plurality of printing instructions.

11. The method of claim 1, wherein portions of a toolpath of said 3D printer are selected and individually manipulated using at least said plurality of printing instructions.

12. A system for updating a plurality of printing instructions for a three-dimensional (3D) printer, comprising:
   computer memory configured to maintain a plurality of printing states corresponding to said plurality of printing instructions usable by said 3D printer for printing a 3D object, wherein a first state of said plurality of printing states corresponds to a first set of one or more printing instructions of said plurality of printing instructions usable by said 3D printer to print a first portion of said 3D object, wherein said plurality of printing states comprises a final state corresponding to one or more final printing instructions of said plurality of printing instructions; and
   one or more computer processors operatively coupled to said computer memory, wherein said one or more computer processors are individually or collectively configured to (i) receive one or more user instructions to select a second state of said plurality of printing states, wherein said second state is not said final state; (ii) generate a new state comprising a second set of one or more printing instructions usable by said 3D printer to print a second portion of said 3D object, wherein said second set of one or more printing instructions usable by said 3D printer to print said second portion of said 3D object at least partially overlaps with said first set of one or more printing instructions usable by said 3D printer to print said first portion of said 3D object; and (iii) update said plurality of printing instructions with said second set of one or more printing instructions in computer memory, to yield an updated plurality of printing instructions.

13. The system of claim 12, wherein said one or more computer processors are individually or collectively configured to receive said one or more user instructions via a user interface.

14. The system of claim 12, wherein said one or more computer processors are individually or collectively configured to provide said plurality of printing instructions in a command history.

15. The system of claim 14, wherein said one or more computer processors are individually or collectively configured to provide said command history inputted by a user.

16. The system of claim 12, wherein said one or more computer processors are individually or collectively configured to direct said updated plurality of printing instructions or derivative thereof to said 3D printer to print said 3D object.

17. The system of claim 12, wherein said one or more computer processors are individually or collectively configured to present said 3D object as a set of stacked segments or a set of stacked toolpaths.

18. The system of claim 12, wherein said one or more computer processors are individually or collectively configured to select and process individual slices of a model of said 3D object using at least said updated plurality of printing instructions.

19. The system of claim 12, wherein said one or more computer processors are individually or collectively configured to select and process individual segments of slices of a model of said 3D object using at least said updated plurality of printing instructions.

20. The system of claim 12, wherein said one or more computer processors are individually or collectively configured to select and manipulate individual portions of a toolpath of said 3D printer using said updated plurality of printing instructions.

* * * * *